(12) United States Patent
Ohashi et al.

(10) Patent No.: US 10,336,329 B2
(45) Date of Patent: Jul. 2, 2019

(54) SADDLED VEHICLE

(71) Applicant: KABUSHIKI KAISHA F.C.C., Hamamatsu-shi (JP)

(72) Inventors: Tatsuyuki Ohashi, Hamamatsu (JP); Kazuyoshi Miyachi, Hamamatsu (JP)

(73) Assignee: Kabushiki Kaisha F.C.C., Hamamatsu-Shi (JP)

( * ) Notice: Subject to any disclaimer, the term of this patent is extended or adjusted under 35 U.S.C. 154(b) by 62 days.

(21) Appl. No.: 15/368,404

(22) Filed: Dec. 2, 2016

(65) Prior Publication Data

US 2017/0080938 A1 Mar. 23, 2017

Related U.S. Application Data

(63) Continuation of application No. PCT/JP2014/064880, filed on Jun. 4, 2014.

(51) Int. Cl.

| | |
|---|---|
| *B60W 30/14* | (2006.01) |
| *B60W 30/16* | (2012.01) |
| *B60W 10/02* | (2006.01) |
| *B60W 10/04* | (2006.01) |
| *B60W 10/10* | (2012.01) |
| *B60W 50/10* | (2012.01) |
| *B62K 21/12* | (2006.01) |
| *B62K 23/04* | (2006.01) |

(Continued)

(52) U.S. Cl.
CPC .......... *B60W 30/146* (2013.01); *B60W 10/02* (2013.01); *B60W 10/04* (2013.01); *B60W 10/10* (2013.01); *B60W 30/16* (2013.01); *B60W 50/10* (2013.01); *B62K 21/12* (2013.01); *B62K 23/04* (2013.01); *B62K 23/06* (2013.01); *B62L 3/00* (2013.01); *B60W 2300/36* (2013.01); *B60W 2540/00* (2013.01); *B60W 2720/10* (2013.01)

(58) Field of Classification Search
None
See application file for complete search history.

(56) References Cited

U.S. PATENT DOCUMENTS

| | | | | |
|---|---|---|---|---|
| 3,982,446 A | * | 9/1976 | Van Dyken | B62K 23/02 74/488 |
| 4,137,793 A | * | 2/1979 | Sowell | B62K 23/04 188/77 R |

(Continued)

FOREIGN PATENT DOCUMENTS

| | | |
|---|---|---|
| JP | H04-306134 | 10/1992 |
| JP | 2006-347508 | 12/2006 |

(Continued)

*Primary Examiner* — Katy M Ebner
(74) *Attorney, Agent, or Firm* — Knobbe, Martens, Olson & Bear LLP

(57) ABSTRACT

A saddled vehicle configured to be driven by a driver sitting on a saddle seat and steering with a handlebar can include a grasping grip to be grasped by a driver and a throttle grip for an accelerator operation respectively, two brakes for braking a front wheel and a rear wheel of the vehicle, each having a different braking operation target, and a cruise control for performing automatic propulsion control of the vehicle wherein the control by the cruise control is performed by changing a control degree in accordance with operation conditions of the first brake and the second brake.

20 Claims, 17 Drawing Sheets

(51) Int. Cl.
*B62K 23/06* (2006.01)
*B62L 3/00* (2006.01)

(56) References Cited

U.S. PATENT DOCUMENTS

| | | | | |
|---|---|---|---|---|
| 4,256,197 A * | 3/1981 | Kiser, Jr. | B62K 11/14 | 180/335 |
| 4,364,283 A * | 12/1982 | Ricardo | F02D 11/02 | 403/324 |
| RE31,196 E * | 4/1983 | Sowell | B62K 23/04 | 188/77 R |
| 4,524,843 A * | 6/1985 | Class | B60K 31/042 | 123/352 |
| 4,569,239 A * | 2/1986 | Shirley | B60K 31/047 | 180/179 |
| 4,580,537 A * | 4/1986 | Uchiyama | B60K 31/08 | 123/349 |
| 4,583,613 A * | 4/1986 | Nakayama | B60K 31/02 | 123/198 DC |
| 4,587,937 A * | 5/1986 | Masuda | B60K 31/102 | 123/349 |
| 4,610,230 A * | 9/1986 | Saito | F02D 11/02 | 123/360 |
| 4,611,561 A * | 9/1986 | Suyama | B60K 31/102 | 123/360 |
| 4,645,027 A * | 2/1987 | Masuda | B60K 31/06 | 180/175 |
| 4,706,195 A * | 11/1987 | Yoshino | B60K 31/0008 | 180/169 |
| 4,809,656 A * | 3/1989 | Suzuki | B60K 31/02 | 123/361 |
| 4,838,780 A * | 6/1989 | Yamagata | B60K 31/047 | 123/352 |
| 4,848,502 A * | 7/1989 | Kikuta | B60K 31/105 | 180/179 |
| 4,875,386 A * | 10/1989 | Dickerson | B62K 11/14 | 74/551.9 |
| 4,969,531 A * | 11/1990 | Hirakata | B60K 31/107 | 180/179 |
| 4,972,918 A * | 11/1990 | Kikuta | B60K 31/107 | 123/352 |
| 5,319,557 A * | 6/1994 | Juman | B60K 31/04 | 180/179 |
| 5,333,515 A * | 8/1994 | Schneider | B62K 23/04 | 403/324 |
| 5,713,428 A * | 2/1998 | Linden | B60K 31/047 | 180/177 |
| 5,893,295 A * | 4/1999 | Bronnert | B62K 11/14 | 188/83 |
| 6,135,227 A * | 10/2000 | Laning | B62K 11/14 | 123/349 |
| 6,250,173 B1 * | 6/2001 | Huston | B62K 11/14 | 74/489 |
| 6,457,381 B1 * | 10/2002 | Nonaka | B60K 31/042 | 74/342 |
| 6,473,684 B1 * | 10/2002 | Shimamura | B60K 31/042 | 180/179 |
| 6,484,855 B1 * | 11/2002 | Yaple | B62L 3/023 | 180/219 |
| 6,820,710 B2 * | 11/2004 | Fechner | B62K 11/14 | 180/170 |
| 6,978,694 B2 * | 12/2005 | Peppard | B62K 23/04 | 74/489 |
| 7,445,071 B2 * | 11/2008 | Yamazaki | B62K 23/04 | 180/170 |
| 7,520,357 B1 * | 4/2009 | Huston | B60K 31/00 | 180/170 |
| 7,520,358 B2 * | 4/2009 | Ehmanns | B60K 31/042 | 180/170 |
| 7,621,380 B2 * | 11/2009 | Wolfe | B60T 7/06 | 188/2 D |
| 7,735,470 B2 * | 6/2010 | Palfenier | B62K 23/04 | 123/400 |
| 7,826,959 B2 * | 11/2010 | Namari | F02D 11/105 | 123/350 |
| 8,291,887 B2 * | 10/2012 | Nozoe | B60K 31/04 | 123/399 |
| 8,296,034 B2 * | 10/2012 | Tetsuka | B60K 31/04 | 123/350 |
| 8,428,851 B2 * | 4/2013 | Itagaki | B60K 26/021 | 701/104 |
| 8,534,397 B2 * | 9/2013 | Grajkowski | B60K 26/04 | 180/170 |
| 8,640,566 B2 * | 2/2014 | Soda | B62K 23/04 | 123/399 |
| 8,794,369 B1 * | 8/2014 | Cruit | B62K 23/08 | 180/219 |
| 9,008,932 B2 * | 4/2015 | Minami | B60W 10/02 | 701/68 |
| 9,216,789 B2 * | 12/2015 | Hamlin | B62J 17/02 | |
| 9,239,023 B2 * | 1/2016 | Sasaki | F02D 41/0002 | |
| 9,346,355 B2 * | 5/2016 | Van Baar | B62K 11/14 | |
| 9,482,170 B2 * | 11/2016 | Matsuda | B60K 31/00 | |
| 9,676,440 B2 * | 6/2017 | Ichikawa | B62K 23/02 | |
| 9,758,041 B2 * | 9/2017 | Hieda | B60K 31/0083 | |
| 9,771,122 B1 * | 9/2017 | Felicilda | B60Q 1/343 | |
| 9,908,516 B2 * | 3/2018 | Kim | B60T 7/042 | |
| 10,000,251 B2 * | 6/2018 | Winters | B62K 11/14 | |
| 2007/0182514 A1 * | 8/2007 | Brandl | B62K 23/04 | 335/37 |
| 2009/0171546 A1 * | 7/2009 | Tozuka | B60K 31/04 | 701/93 |
| 2010/0097325 A1 * | 4/2010 | Nagao | B62K 11/14 | 345/173 |
| 2010/0204874 A1 * | 8/2010 | Oyer | B60K 31/047 | 701/31.4 |
| 2010/0294077 A1 * | 11/2010 | Odendaal | B62K 11/14 | 74/543 |
| 2013/0111983 A1 * | 5/2013 | Mauch | B62K 23/04 | 73/114.36 |
| 2014/0032042 A1 * | 1/2014 | Taniguchi | B62K 11/14 | 701/36 |
| 2017/0144665 A1 * | 5/2017 | Ohashi | B60W 30/16 | |
| 2017/0327177 A1 * | 11/2017 | Mizuno | B62J 99/00 | |
| 2018/0079465 A1 * | 3/2018 | Tetsuka | B60K 31/00 | |
| 2018/0154975 A1 * | 6/2018 | Oshiro | B62K 23/04 | |

FOREIGN PATENT DOCUMENTS

| | | |
|---|---|---|
| JP | 2009-154713 | 7/2009 |
| JP | 2009-184579 | 8/2009 |

* cited by examiner

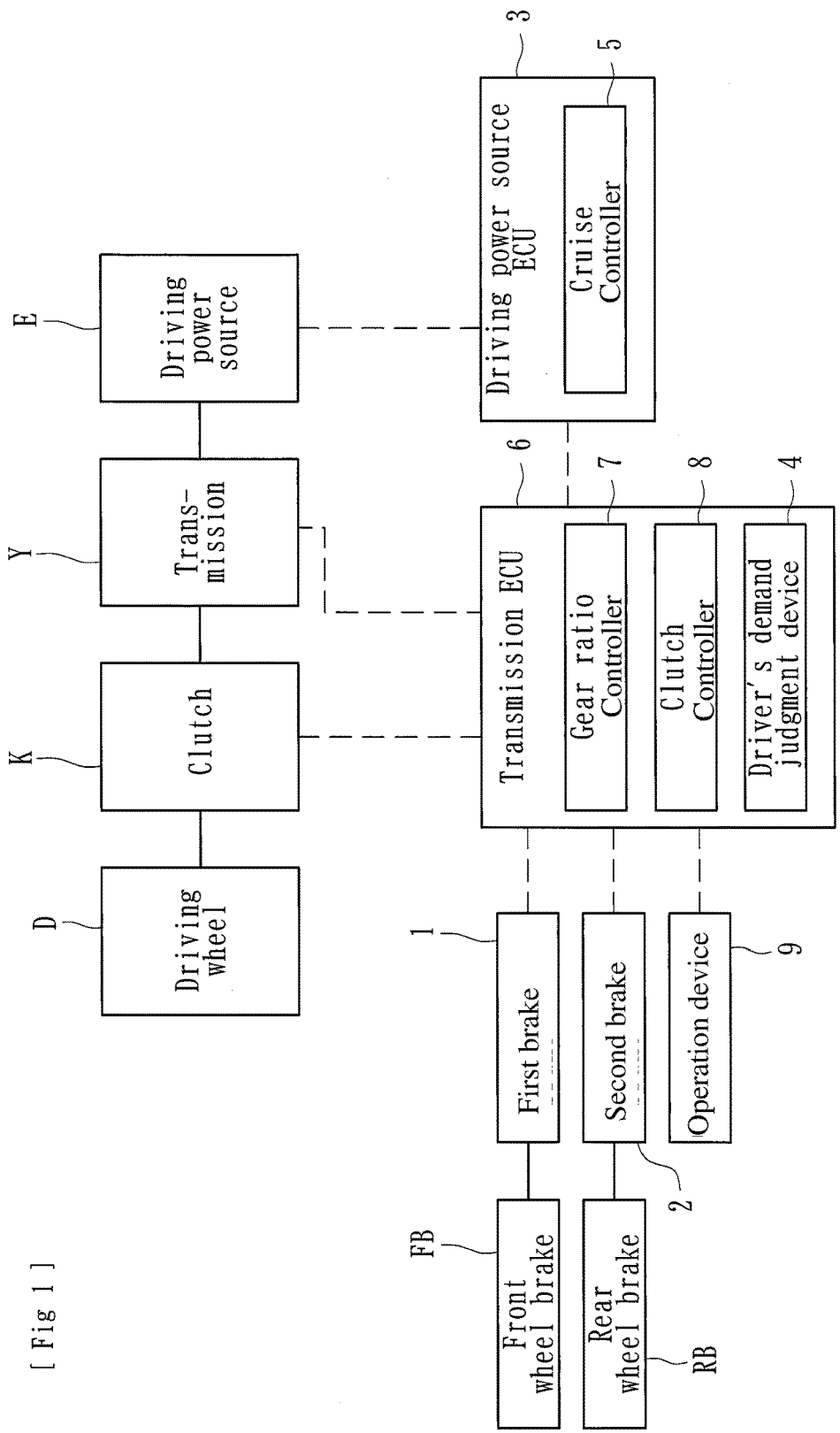
[Fig 1]

[Fig 2]
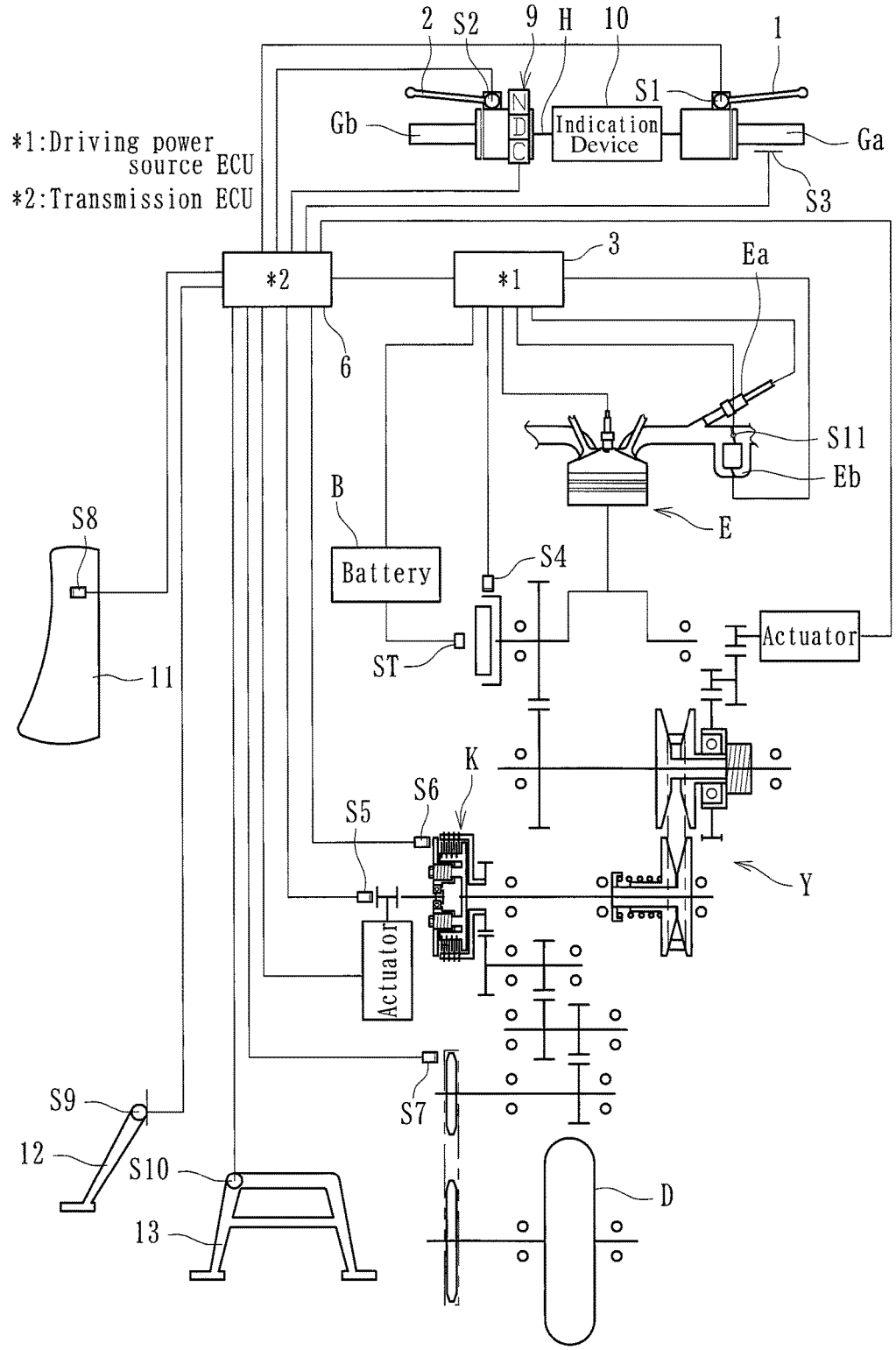

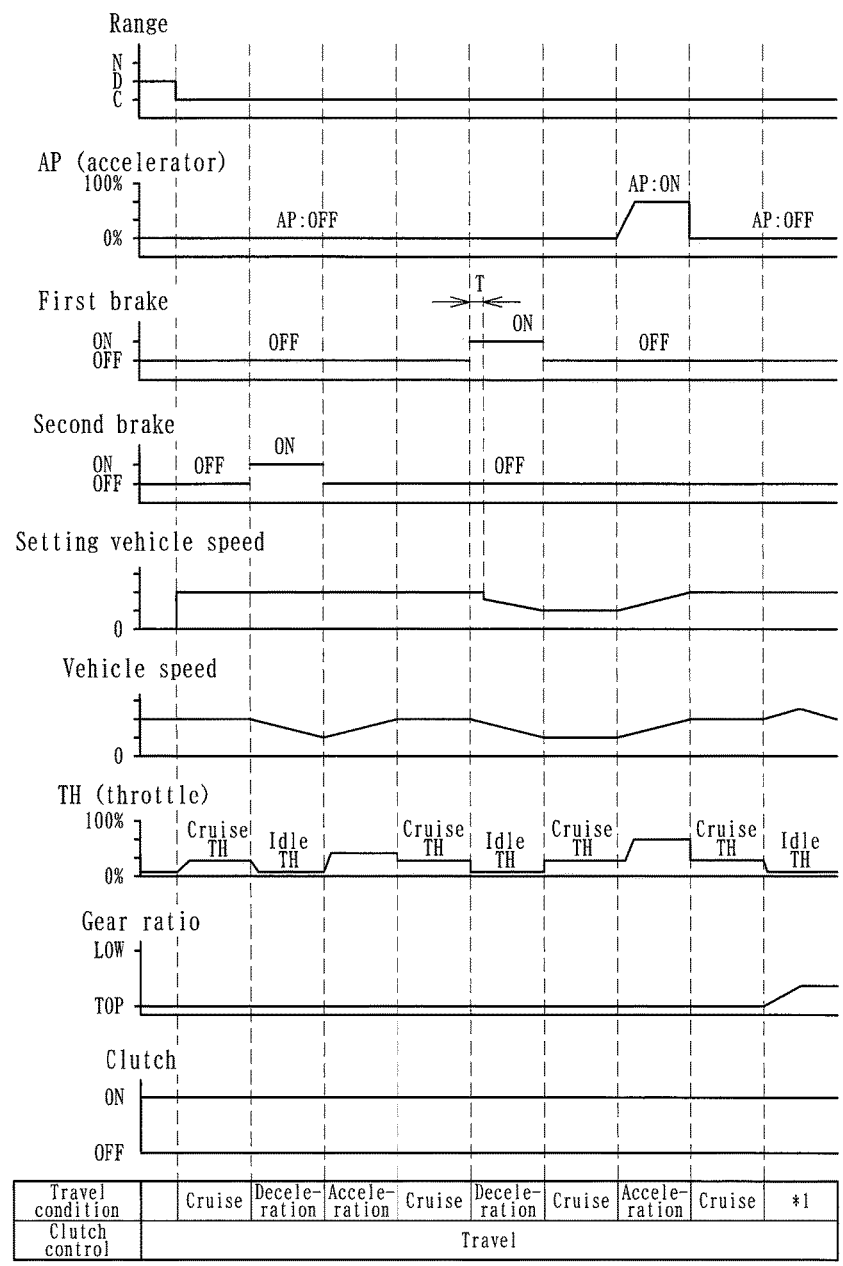
[Fig 3]

[Fig 4]
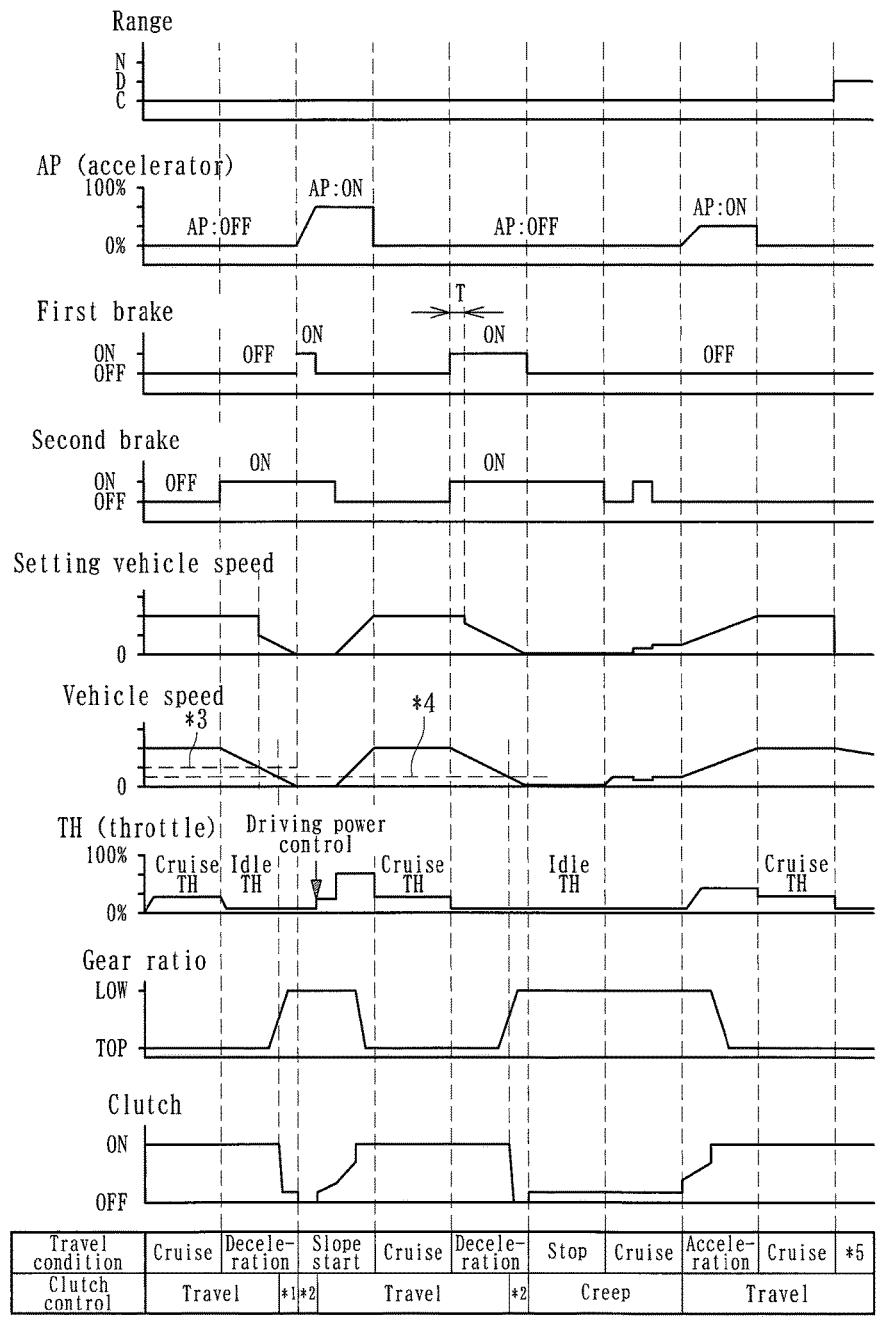

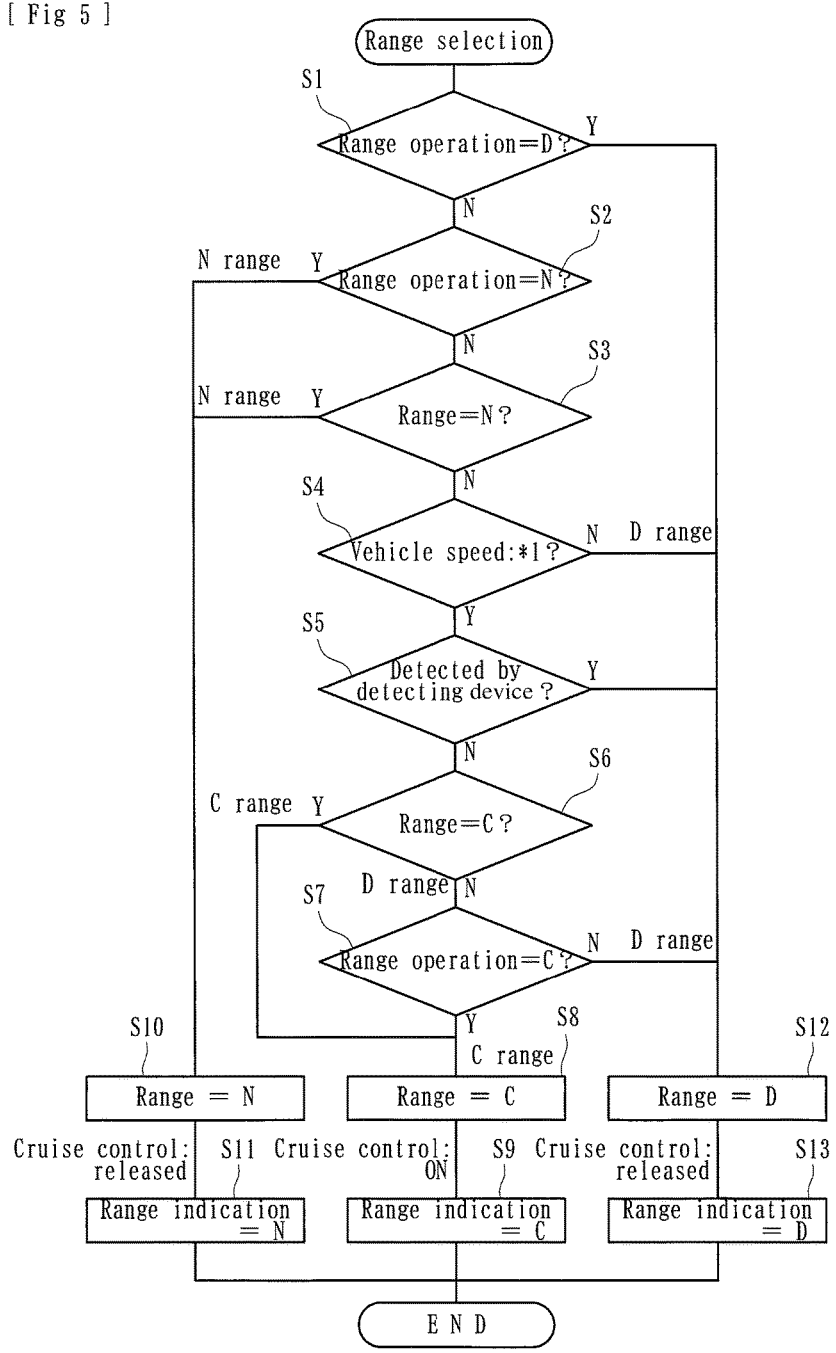
[Fig 5]

[Fig 6]
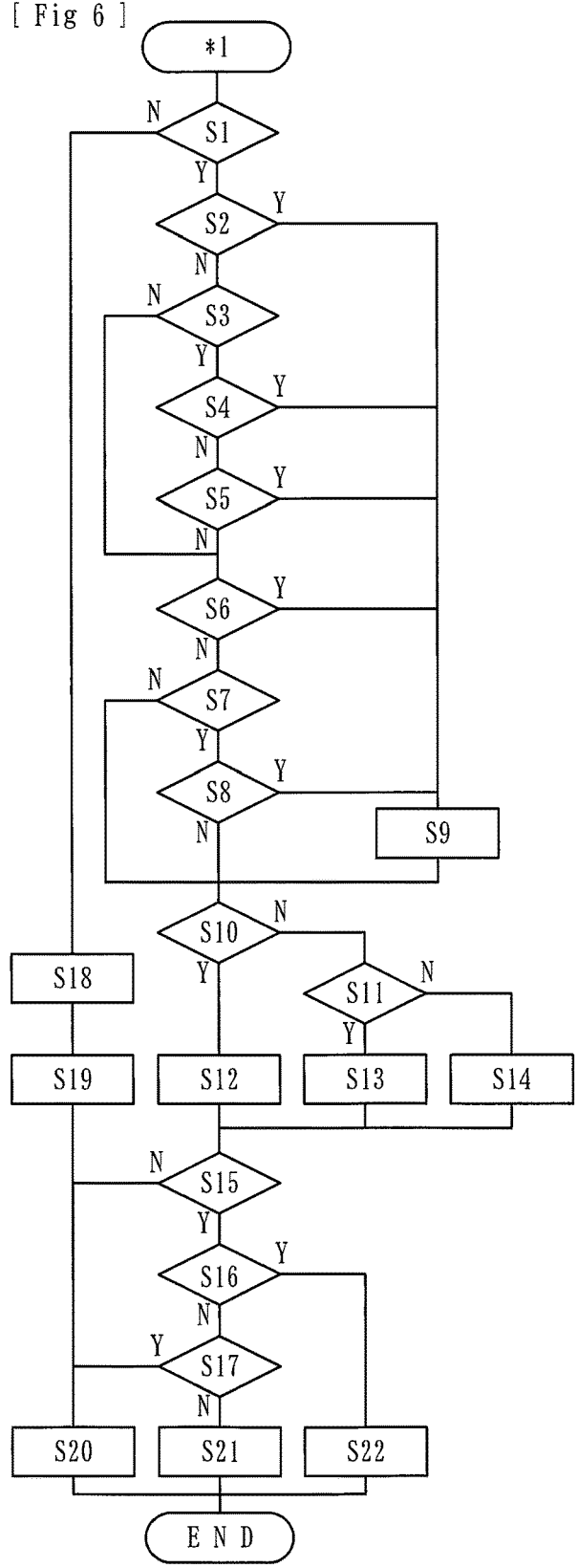

[Fig 7]
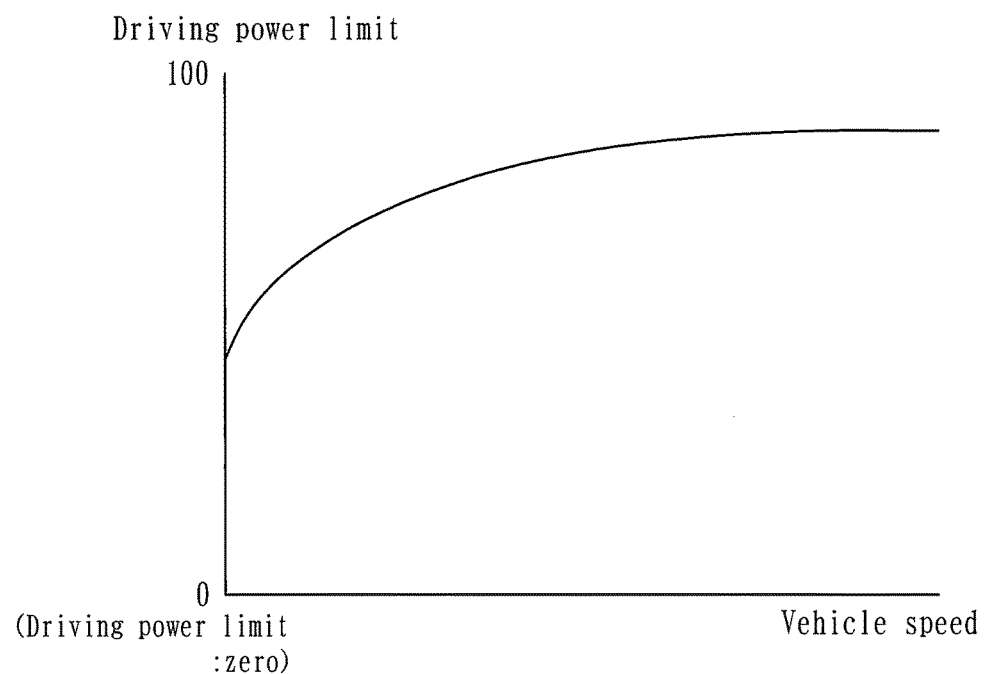

[Fig 8]
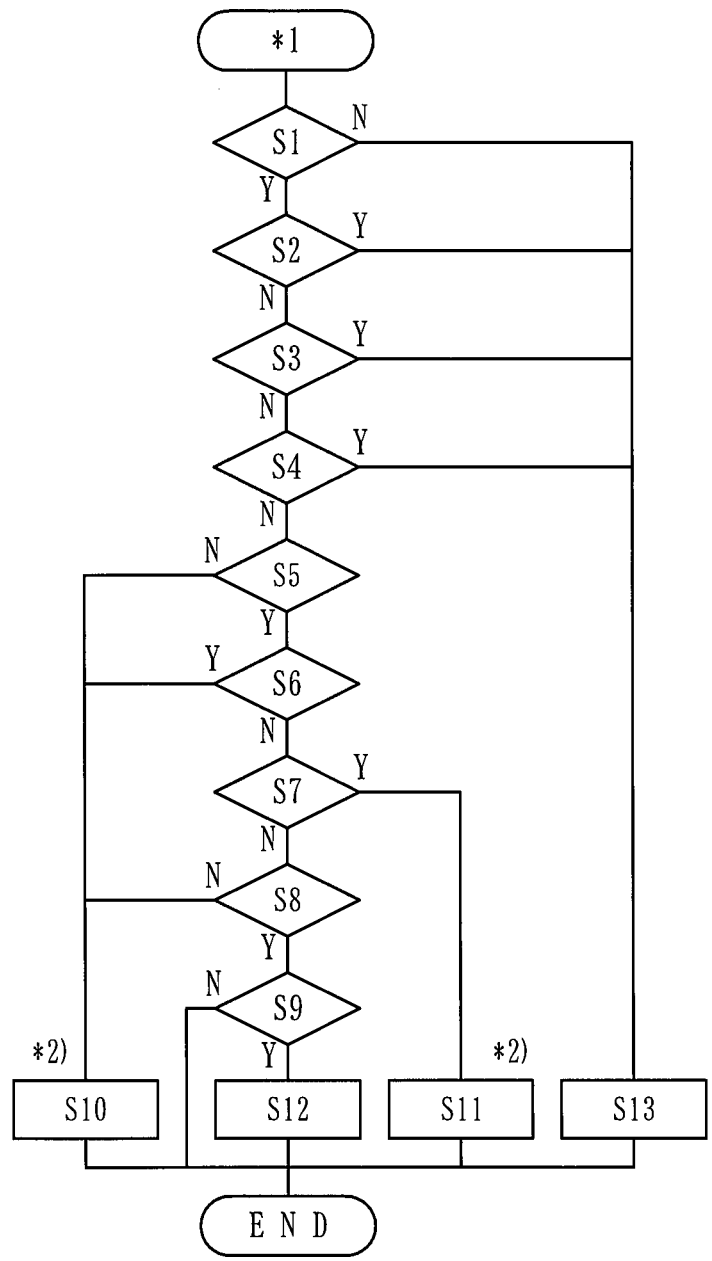

[Fig 9]
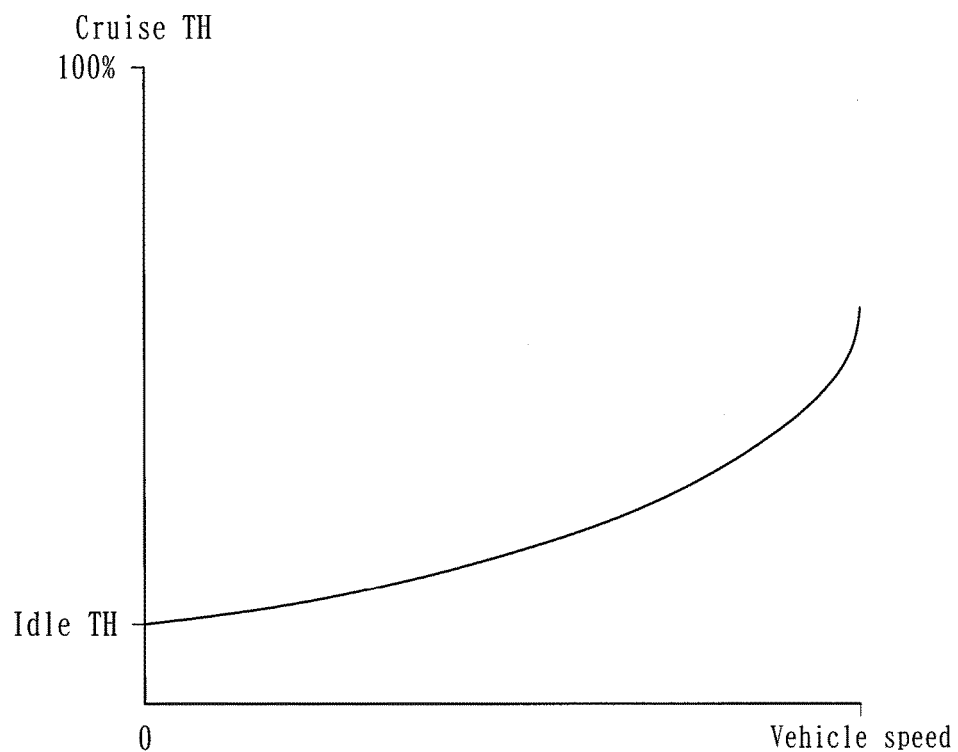
[Fig 10]
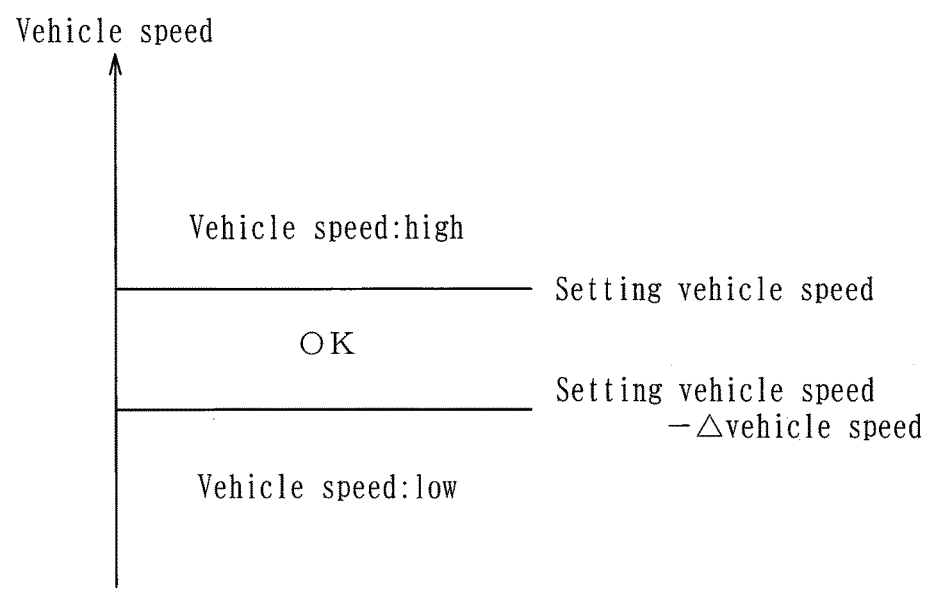

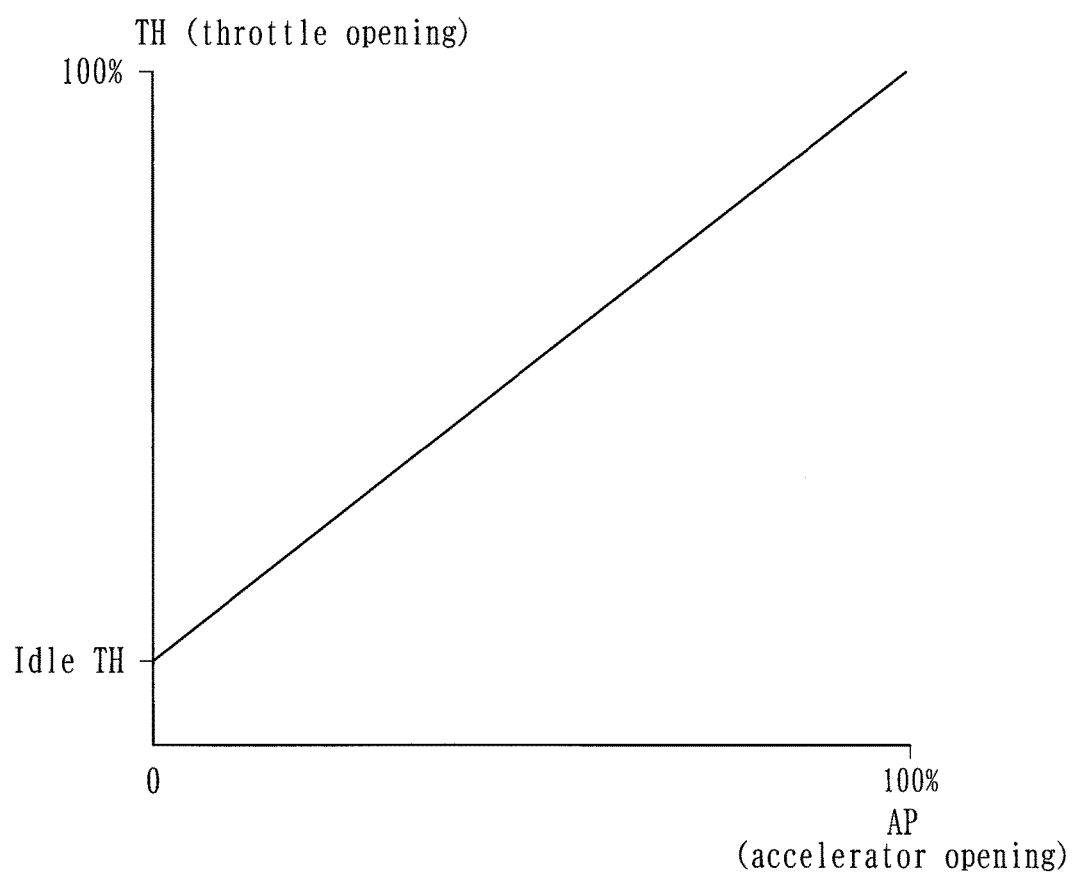

[ Fig 12 ]
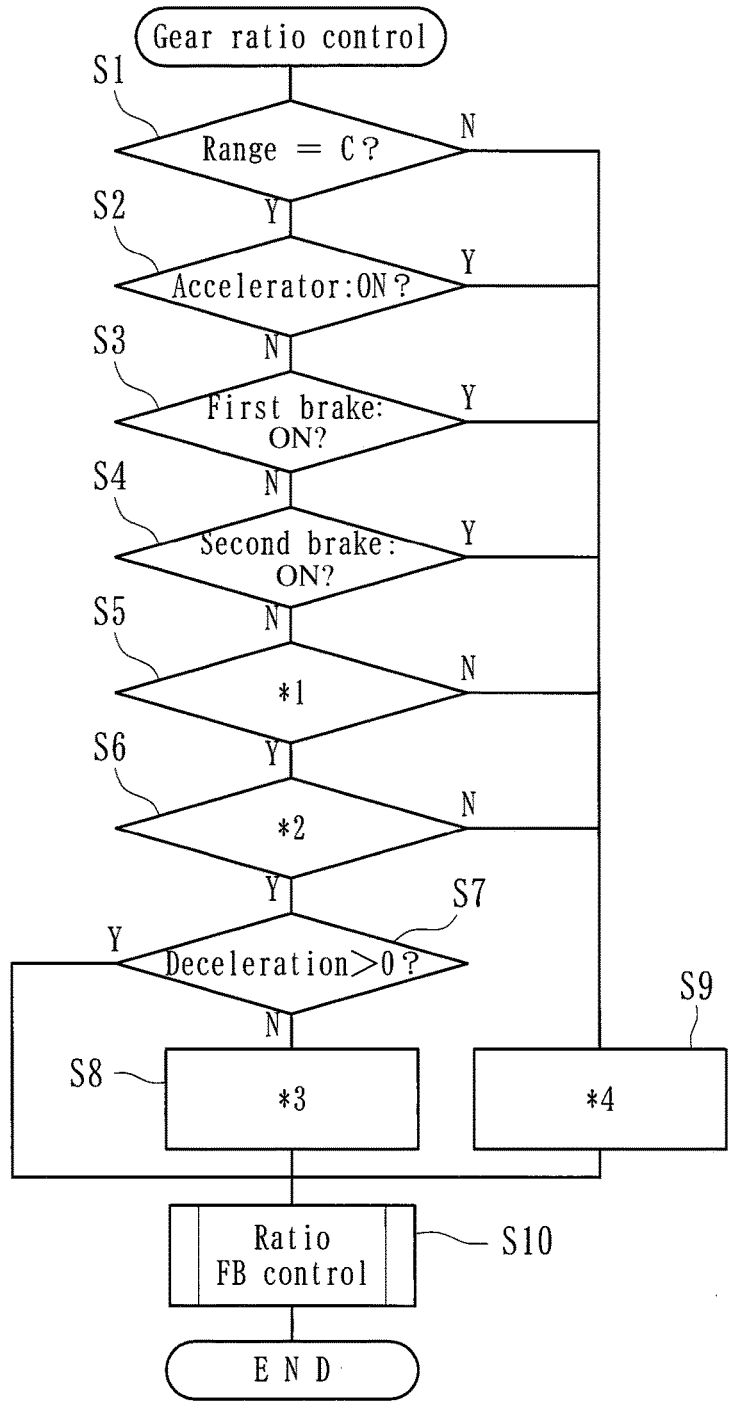

[Fig 13]
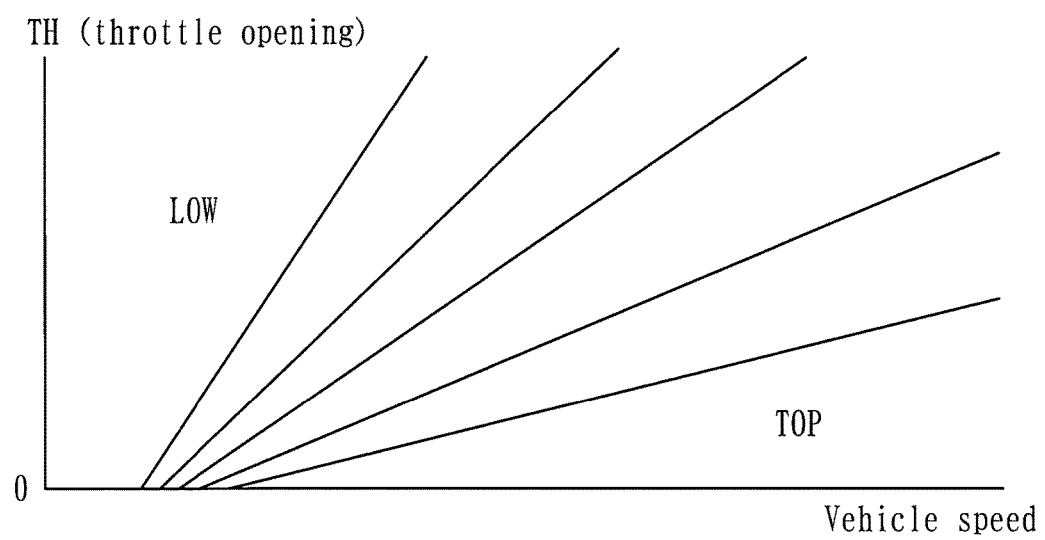

[ Fig 14 ]
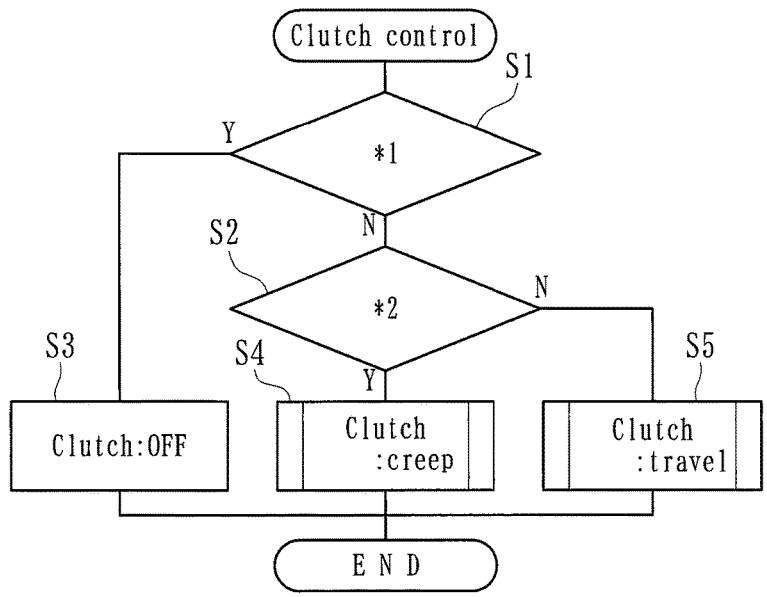
[ Fig 15 ]
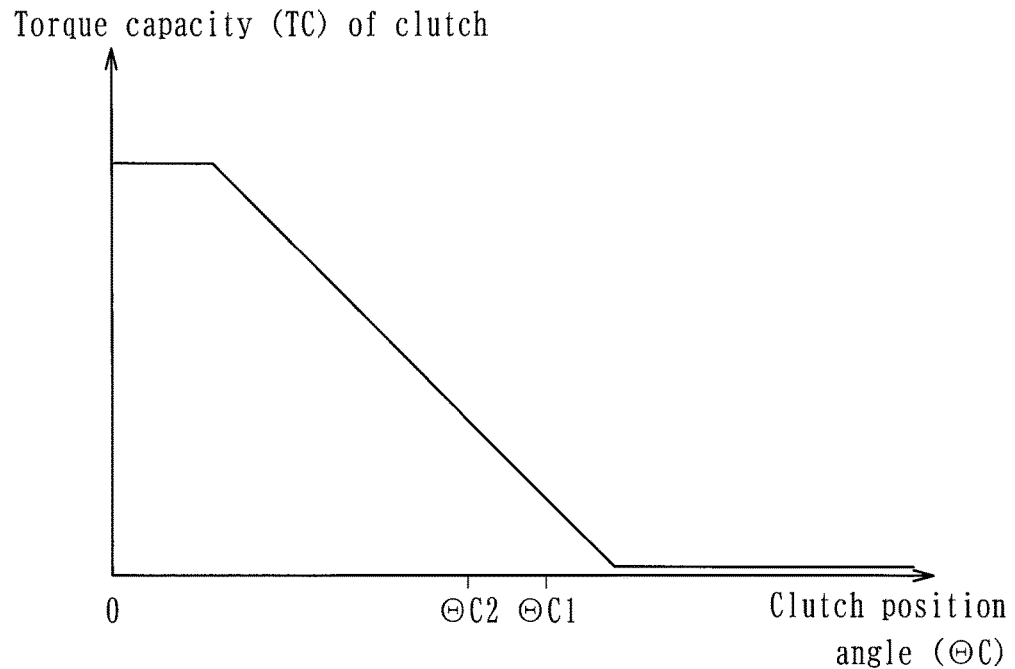

[ Fig 16 ]
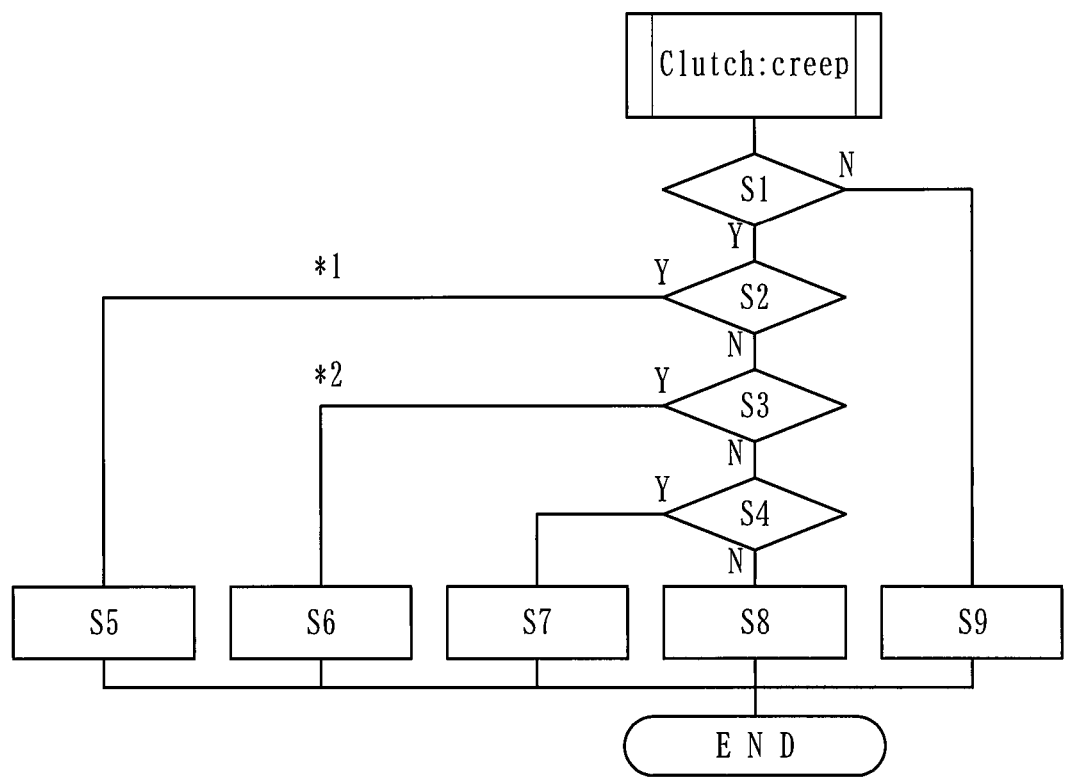

[Fig 17]
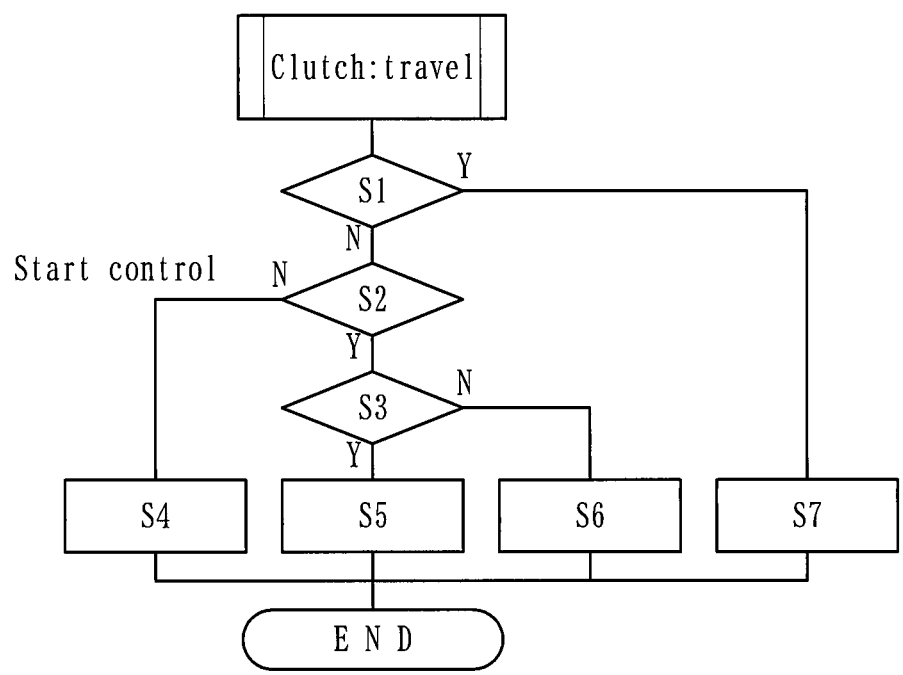

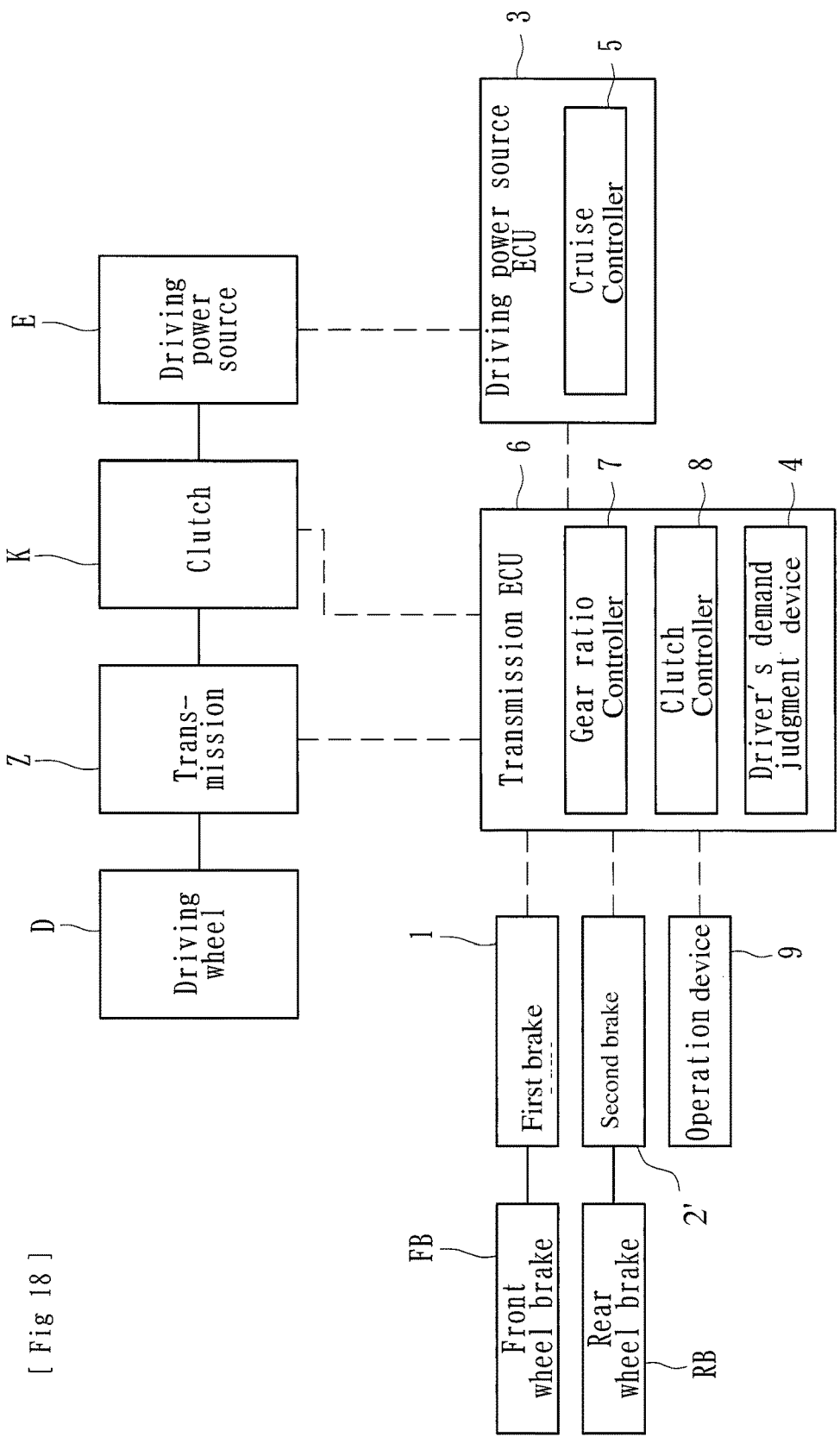
[Fig 18]

[Fig 19]
*1:Driving power source ECU
*2:Transmission ECU
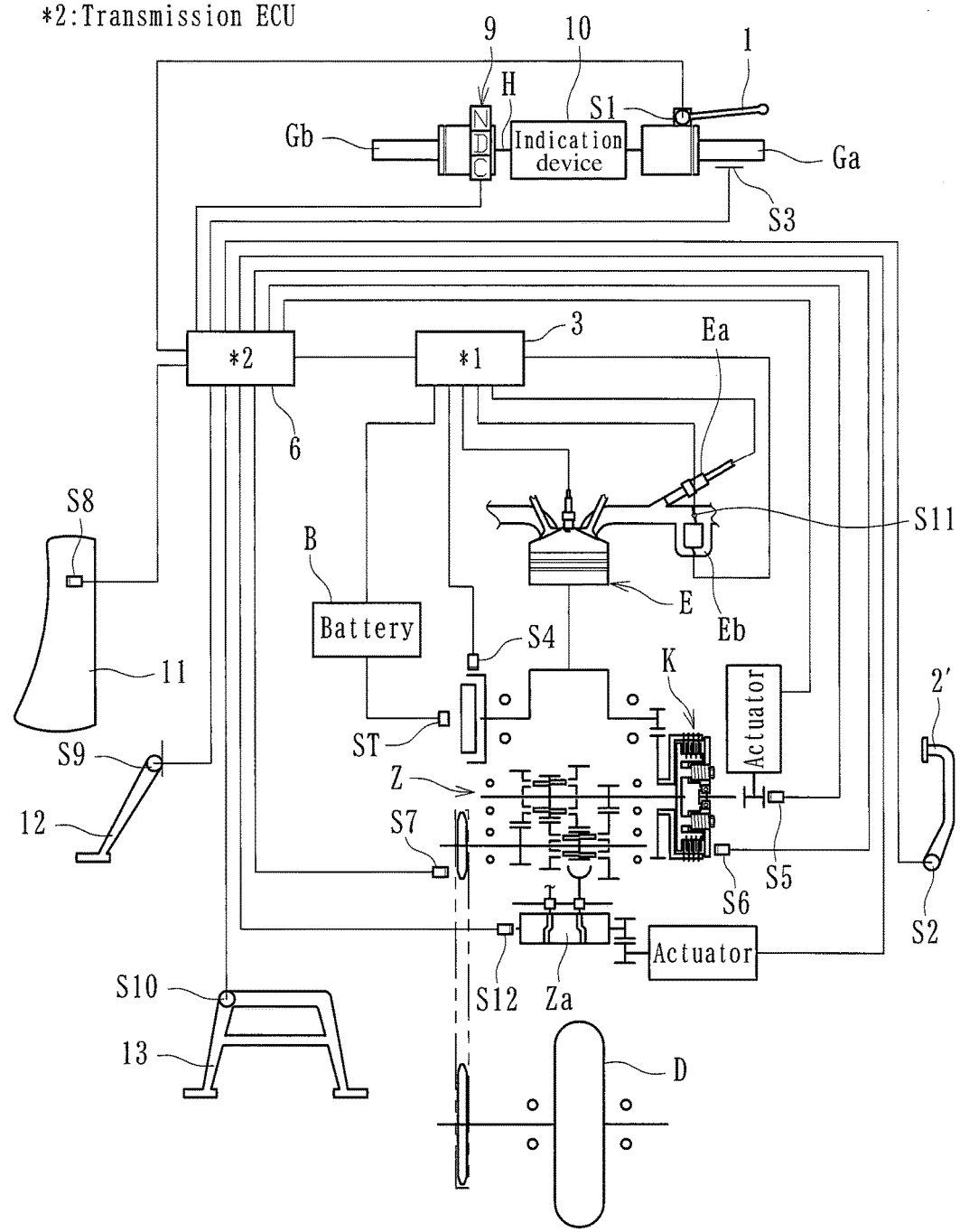

SADDLED VEHICLE

BACKGROUND OF THE INVENTIONS

Field of the Inventions

The present inventions relate to saddled vehicles driven by a driver sitting on a saddle seat of the vehicle steered with a handlebar.

Description of the Related Art

It can be difficult to operate a vehicle, such as automobiles or motorcycles, at a constant speed. Accordingly, various vehicles have been proposed cruise control functionalities for maintaining a constant speed, such as those described in Japanese Patent Document JP 2006-347508 A. The cruise control of the JP 2006-347508 A document is configured so that setting of target vehicle speed or change of the target speed of vehicle can be achieved by operating a vehicle speed setting switch and release of the cruise control can be achieved by operating a cancel switch.

SUMMARY OF THE INVENTIONS

An aspect of at least one of the inventions disclosed herein includes the realization that, in the JP 2006-347508 A document noted above, since a plurality of switches such as a cancel switch etc. relating to the cruise control are required other than the vehicle speed setting switch, an undesirably wide mounting space is required to accommodate convenient operation of the switches.

For example, when a saddled vehicle is driven by a driver sitting on a saddle seat of the vehicle and steering the vehicle with a handlebar, it is necessary for the driver to operate the cruise control switches while grasping the grips mounted on the ends of the handlebar. When the plurality of switches are used for controlling the cruise control, the degree of freedom of layout of the switches arranged on and in the vicinity of the handlebar grips is significantly limited. Use of smaller switches and tight spacing could negatively impact switch operability.

In addition, in the system described in the JP 2006-347508 A document, since the cruise control is released when any braking operation is performed, the cruise control is released even when a rear wheel is braked for turning or curving a vehicle such as a saddled vehicle, including a motorcycle. Accordingly, a driver must operate a cruise control setting switch or a resume switch (switch for returning to a setting vehicle speed before braking) even after a such a maneuver where cancellation of a cruise control set speed may not be desired by the driver.

It is therefore an object of the present invention to provide a saddled vehicle which can reduce a number of switches and a switch operation number necessary for the cruise control and improve the operability relating to the cruise control.

According to some embodiments, there is provided a saddled vehicle driven by a driver sitting on a saddle seat with steering a handlebar comprising a handlebar on both tip ends of which are provided with a grasping grip to be grasped by a driver and a throttle grip for an accelerator operation respectively; two operation means for performing braking operation of a front wheel and a rear wheel, i.e. a first brake means and a second brake means each having a different braking operation target; and a cruise control means for performing automatic travel of the vehicle with controlling the vehicle to an arbitrary control degree characterized in that the control by the cruise control means is performed by changing the control degree in accordance with operation conditions of the first brake means and the second brake means.

Some embodiments can further include a driver's demand judgment means for judging a driver's demand for the cruise control means based on the operation conditions of the first brake means and the second brake means and wherein the control by the cruise control means is performed based on the driver's demand judged by the driver's demand judgment means.

In some embodiments, the control degree of the vehicle by the cruise control means is setting a vehicle speed.

In some embodiments, the cruise control means changes the setting or "target" vehicle speed to a vehicle speed at a time of completion of the braking operation when at least the front wheel is braked by the first brake means or the second brake means.

In some embodiments, the cruise control means performs the change of the setting vehicle speed subject to that the braking operation of the front wheel by the first brake means or the second brake means is performed.

In some embodiments, the cruise control means performs the change of the setting vehicle speed subject to that the deceleration of the vehicle has reached a predetermined value or more when the braking operation of the front wheel by the first brake means or the second brake means is performed.

In some embodiments, the cruise control means keeps the setting vehicle speed when only the rear wheel has been braked by the first brake means or the second brake means.

In some embodiments, the cruise control means changes the setting vehicle speed to a vehicle speed at a time of completion of the braking operation subject to that only the rear wheel has been braked by the first brake means or the second brake means when the vehicle is lower than a predetermined speed.

In some embodiments, the cruise control means changes the setting vehicle speed to a vehicle speed at a time of completion of the accelerator operation when the accelerator operation is performed by the throttle grip.

In some embodiments, a creep control for travelling is performed by controlling the clutch under states of no accelerator operation by the throttle grip and of idling of the driving source subject to that the vehicle speed is lower than a predetermined value.

In some embodiments, it becomes a neutral state in the creep control when both the first brake means and the second brake means are operated.

Some embodiments can further include a driving power limiting means and wherein the control degree of the vehicle by the cruise control means is a limit degree determined by the driving power limiting means.

In some embodiments, the first brake means is mounted on the bar handle at a position near the throttle grip and the second brake means is mounted on the other position and wherein the driving power limit degree of the second brake means is set smaller than that of the first brake means.

In some embodiments, a cruise control range and a drive range are selectable and wherein the control by the cruise control means is performed when the cruise control range is selected and the control by the cruise control means is released when the drive range is selected.

Some embodiments can further include detection means for detecting operated positions of stands for holding the vehicle in the stand position and a detection means for detecting presence or absence of a driver on a saddle seat and wherein the control by the cruise control means is released when the detection means has detected the operated positions of stands or the detection means has detected absence of a driver on a seat.

In some embodiments in which the control by the cruise control means is performed by changing the control degree in accordance with operation conditions of the first brake means and the second brake means, it is possible to reduce a number of switches and a switch operation number necessary for the cruise control and improve the operability relating to the cruise control.

In some embodiments, it is possible to surely obtain driver' demands for the cruise control means from difference of operations of the first brake means and the second brake means peculiar to the saddled vehicle as compared to a vehicle having a single brake means.

In some embodiments in which the control degree of the vehicle by the cruise control means is a setting vehicle speed, it is possible to further improve the operability relating to the cruise control.

In some embodiments in which the cruise control means changes the setting vehicle speed to a vehicle speed at a time of completion of the braking operation when at least the front wheel is braked by the first brake means or the second brake means, it is possible to further improve the operability when changing the setting vehicle speed. That is, since speed reduction is usually intended in many cases when braking a front wheel, it is possible to conform to requirements of a driver by changing the setting vehicle speed to a vehicle speed at a time of completion of the braking operation. This enables to eliminate an operation of a coast switch (switch for reducing the setting vehicle speed) and thus to improve the operability of a vehicle.

In some embodiments in which the cruise control means performs the change of the setting vehicle speed subject to that the braking operation of the front wheel by the first brake means or the second brake means has been continuously performed for a predetermined period of time, it is possible to suppress a change of the setting vehicle speed different from intention of a driver.

In some embodiments in which the cruise control means performs the change of the setting vehicle speed subject to that the deceleration of the vehicle has reached a predetermined value or more when the braking operation of the front wheel by the first brake means or the second brake means is performed, it is possible to suppress a change of the setting vehicle speed different from intention of a driver.

In some embodiments in which the cruise control means keeps the setting vehicle speed when only the rear wheel has been braked by the first brake means or the second brake means, it is possible to suppress a change of the setting vehicle speed different from intention of a driver and thus to improve the operability of vehicle. That is, since weak speed reduction, fine adjustment or making of opportunity of latitude change in cases of turning or curving of a vehicle is usually intended in many cases when braking only a rear wheel, it is possible to return to the setting vehicle speed before braking if keeping the setting vehicle speed when the braking operation has been completed. This enables to eliminate an operation of a resume switch (switch for returning to a setting vehicle speed before braking) and thus to improve the operability of a vehicle.

In some embodiments in which the cruise control means changes the setting vehicle speed to a vehicle speed at a time of completion of the braking operation subject to that only the rear wheel has been braked by the first brake means or the second brake means when the vehicle is lower than a predetermined speed, it is possible to achieve a low speed travel by changing the setting vehicle speed when the vehicle speed is reduced to a slow speed e.g. at an intersection requiring a slow speed and accordingly possible to prevent acceleration against a driver's will after release of the braking operation.

In some embodiments in which the cruise control means changes the setting vehicle speed to a vehicle speed at a time of completion of the accelerator operation when the accelerator operation is performed by the throttle grip, it is possible to eliminate an operation of an accelerator switch (switch for increasing the setting vehicle speed) and thus improve the operability of a vehicle as well as to change the setting vehicle speed by operations of the throttle grip in addition to the first and second brake means.

In some embodiments in which a creep control for travelling is performed by controlling the clutch under states of no accelerator operation by the throttle grip and of idling of the driving source subject to that the vehicle speed is lower than a predetermined value, it is possible for a driver to perform fine adjustment of vehicle speed and thus to achieve smooth travel without accelerator operation in traffic jam etc. during the cruise control.

In some embodiments in which the vehicle becomes a neutral state in the creep control when both the first brake means and the second brake means are operated, it is possible to perform a control according to intentions of a driver. That is, since a driver usually intends to stop a vehicle in many cases when both the first and second brake means are operated, it is possible to perform a control matched with requirements of a driver by shifting to the neutral state.

In some embodiments in which the saddled vehicle further comprises a driving power limiting means and the control degree of the vehicle by the cruise control means is a limit degree determined by the driving power limiting means, the throttle opening is automatically controlled by throttle control during the cruise control. However, since the throttle opening is controlled toward a closing side by limiting the driving power with preferentially braking when a driver has operated the first brake means or the second brake means, sure braking can be attained. This enables to eliminate the braking operation to release the cruise control as the prior art. In addition, since the driving power can be limited preferentially to braking when a driver erroneously operated the first brake means or the second brake means simultaneously with the throttle grip during the cruise control, it is possible to prevent an unintentional sudden acceleration.

In some embodiments in which the first brake means is mounted on the handlebar at a position near the throttle grip and the second brake means is mounted on the other position and the driving power limit degree of the second brake means is set smaller than that of the first brake means, it is possible to prevent reversing of a vehicle on an uphill road during release of operation of the second brake means and thus to achieve smooth start of a vehicle by reducing the driving power limitation to a degree in which a vehicle does not move backward when both the second brake means and the throttle grip are simultaneously operated for performing an uphill road start.

In some embodiments in which a cruise control range and a drive range are selectable and the control by the cruise control means is performed when the cruise control range is selected and the control by the cruise control means is released when the drive range is selected, it is possible to eliminate a separate switch for releasing the cruise control.

In some embodiments in which the control by the cruise control means is released when the detection means has detected the operated positions of stands or the detection means has detected absence of a driver on a seat, it is possible to eliminate a separate switch for releasing the cruise control and to more securely release the cruise control.

BRIEF DESCRIPTION OF THE DRAWINGS

FIG. 1 is a block diagram showing a concept of the saddled vehicle according to a first embodiment of the present invention;

FIG. 2 is a schematic view showing a general structure of the saddled vehicle of FIG. 1;

FIG. 3 is a timing chart showing the travelling state during the cruise control of the saddled vehicle;

FIG. 4 is a timing chart showing the travelling state during the cruise control of the saddled vehicle;

FIG. 5 is a flowchart showing controls in range selections of the saddled vehicle;

FIG. 6 is a flowchart showing controls of the driver's demand judgment means of the saddled vehicle;

FIG. 7 is a graph showing a relation between a driving power limit and a vehicle speed;

FIG. 8 is a flowchart showing the cruise control (throttle control) of an engine of the saddled vehicle;

FIG. 9 is a graph showing a relation between the throttle opening and the vehicle speed at an initial time of start of the cruise control of the saddled vehicle;

FIG. 10 is a graph for judging suitability of the present vehicle speed relative to the setting vehicle speed of the saddled vehicle;

FIG. 11 is a graph showing a relation between the throttle opening and the operation degree of the throttle grip (accelerator opening);

FIG. 12 is a flowchart showing the gear ratio control of the saddled vehicle;

FIG. 13 is a graph showing the gear ratio map of the saddled vehicle;

FIG. 14 is a flowchart showing the clutch control of the saddled vehicle;

FIG. 15 is a graph showing characteristics of the clutch torque capacity;

FIG. 16 is a flowchart showing the clutch control during creep of the saddled vehicle;

FIG. 17 is a flowchart showing the clutch control during travel of the saddled vehicle;

FIG. 18 is a block diagram showing a saddled vehicle according to a second embodiment; and FIG. 19 is a schematic view showing a general structure of the saddled vehicle of FIG. 18.

DETAILED DESCRIPTION OF THE PREFERRED EMBODIMENT

Embodiments are described below in the context of saddled vehicle because the inventions disclosed herein have particular utility in that context. However, the inventions disclosed herein can be used in other contexts as well, including vehicles with more than two wheels, and other types of propulsion systems.

A saddled vehicle of the first embodiment of the present invention is shown as a two-wheeled vehicle, configured to be driven by a driver sitting on a saddle seat and steering a handlebar. The vehicle comprises, as shown FIGS. 1 and 2, a driving power source (an engine in the present embodiments) E, a handlebar H, a transmission (a continuously variable transmission (CVT) in the first embodiment) Y, a clutch K, two operation means for braking the vehicle comprising a first brake 1 and a second brake 2, a driving power source ECU (driving power source ECU) 3 comprising a cruise controller 5 (which can serve as a cruise control means), and a transmission ECU 6 comprising a driver's demand judgment device 4 (which can serve as a driver's demand judgement means), a gear shift controller 7 (which can serve as a gear shift control means) and a clutch controller 8 (which can serve as a clutch control means). A reference character "ST" in FIG. 2 denotes a starter for starting the driving power source E.

The handlebar H can be used for steering the vehicle. On both tip ends of the handlebar H are respectively mounted a grasping grip Gb which can be mounted in a fixed position and configured to be grasped by a driver's left hand and a throttle grip Ga for accelerator operation, which can be grasped and rotated by a driver's right hand. An operation device 9 (which can serve as an operation means) for selecting a desired travelling mode of the vehicle can be mounted on the tip end of the handlebar H where the grasping grip Gb is mounted (base end side of the grasping grip Gb). The operation means 9 can be configured to be switched between a neutral range (N range), a drive range (D range) and a cruise control range (C range), for example, by operation of the operation means 9 with a driver's hand grasping the grasping grip Gb.

This embodiment can be configured so that the cruise control range (C range) and the drive range (D range) can be selected by the operation means 9 as a travel range and the cruise control can be performed by a cruise control means 5 later described when C range can be selected and the cruise control by the cruise control means 5 can be released when D range is selected. This configuration enables the elimination of a separate switch for releasing the cruise control. The selected range (N range, D range or C range) can be indicated by an indication device 10, which can be in the form of an electric display device arranged at a position visible by a driver, and which can serve as an indication means for indicating the operational state of the operation means 9.

The throttle grip Ga can be configured to perform accelerator operation while being grasped by a driver and rotated a predetermined angle to supply a desired amount of fuel to cylinder(s) of the driving power source E by opening and closing a fuel injection valve Ea and throttle opening adjust valve Eb of the driving power source E in accordance with its rotated angle in order to drive the driving power source E at a desirable rotation or power output. A suitable switch case for operating various electronic parts of the vehicle can be mounted on the handlebar H at the base end of the throttle grip Ga.

The first brake means 1, which can serve as a first brake operation device, first brake operation means, or first brake operation input member, can be mounted on the tip end of the handlebar H (base end of the throttle grip Ga). The first brake means 1 comprises a swingable lever operated by a hand of a driver grasping the throttle grip Ga and the vehicle is braked, for example, with a front wheel brake FB being operated when the swing motion is detected by a brake operation detection sensor Sn1.

The second brake means 2, which can serve as a second brake operation device, second brake operation means, or second brake operation input member can be mounted on the tip end of the handlebar H (base end of the grasping grip Gb). Similarly to the first brake means 1, the second brake means 2 comprises a swingable lever operated by a hand of a driver grasping the grasping grip Gb and the vehicle is braked, for example, with a rear wheel brake RB being operated when the swing motion is detected by a brake operation detection sensor Sn2.

As described above, the first brake means 1 can brake the front wheel by operating the front wheel brake FB and the second brake means 2 can brake the rear wheel by operating the rear wheel brake RB in this embodiment. However, if the brake system comprises two operation devices for braking the front and rear wheels and the object for braking is different each other, it may be configured so that a first brake means 1 can brake the front wheel and a second brake means 2 can brake both the front and rear wheels by operating both the front and rear wheel brake FB, RB.

The saddled vehicle of the present embodiment can comprise detection sensors Sn9 and Sn10 for detecting states (operated state or not-operated state) respectively of the side stand 12 and the main stand 13, a detection sensor Sn8 for detecting presence or absence of a seated driver on the saddle seat 11, a detection sensor Sn3 for detecting presence or absence of grip (contact) of the throttle grip Ga, an engine rotation sensor Sn4 electrically connected to the ECU 3 and a vehicle speed sensor Sn7 for detecting the vehicle speed.

The transmission Y and the clutch K are arranged in the middle of the power transmitting path from the driving power source E to the driving wheel D. The transmission Y of the present embodiment comprises a CVT automatically changeable to a gear ratio according to a range set by the operation means 9. The transmission Y can be controlled by a gear ration control mean 7 and transmits the driving power of the driving power source E to the driving wheel D when the operation means 9 is set at D range (drive range) and C range (cruise control range) as and does not transmit the driving power of the driving power source E to the driving wheel D by cutting off power transmission with having the clutch K "OFF" at "N" range (neutral range).

The clutch K can be a multiple disc clutch in this embodiment arranged on the power transmitting path between the transmission Y and the driving wheel D and adapted to transmit and cut off the driving power of the driving power source E to the driving wheel D any time during operation of the vehicle. The clutch K can be switched between an "ON" state in which the driving power of the driving power source E can be transmitted to the driving wheel D and an "OFF" state in which the driving power of the driving power source E cannot be transmitted to the driving wheel D.

The clutch K of the present embodiment can be provided with a clutch position angle sensor Sn5 and a clutch rotation sensor Sn6 and detected signals from these sensors Sn5, Sn6 can be transmitted to the transmission ECU 6. The press-contacted condition of clutch discs can be determined from the detected signals and thus the torque capacity (TC) of the clutch K can be determined.

The transmission ECU 6 can comprise a microcomputer etc. for controlling the transmission Y and the clutch K and can be electrically connected to the driving power source ECU 3 for transmitting and receiving electric signals therebetween as well as electrically connected to actuators etc. of the transmission Y and the clutch K. As shown in FIG. 1, the transmission ECU 6 can comprise the driver's demand judgment means 4, a gear ration control mean 7 for controlling the transmission Y and a clutch control means 8 for controlling the clutch K.

The driver's demand judgment means 4 can be configured to judge the driver's demand for the cruise control means 5 on the basis of operation conditions of the first and second brake means 1, 2. That is, according to the present embodiment, it can be configured to perform a control by the cruise control means 5 in the cruise control range on the basis of the driver's demand judged by the driver's demand judgment means 4.

The driving power source ECU (driving power source ECU) 3 can be formed of a microcomputer etc. for controlling the driving power source E and can be connected to the battery B equipped on the vehicle to be supplied with electric power and to transmit and receive electric signals with being electrically connected to the transmission ECU 6. The driving power source ECU 3 of the present embodiment comprises the cruise control means 5.

The cruise control means 5 can be configured to enable the vehicle to be automatically speed-controlled by controlling the vehicle speed to an arbitrary or user-selected speed in the cruise control range (C range) and configured to perform a control by the cruise control means 5 with changing the control degree in accordance with the operation conditions of the first and second brake means 1, 2. The control degree of the vehicle by the cruise control means 5 is determined as the setting or "target" vehicle speed which is initially set to a then current vehicle speed when the operation means 9 is changed to the cruise control range (C range).

The cruise control means 5 can also be configured to change the set vehicle speed to a target or "setting" vehicle speed at a time of completion of a braking operation when at least the front wheel is braked by the first brake means 1 or the second brake means 2 (first brake means 1 in this embodiment).

For example as shown in FIGS. 3 and 4, the vehicle speed can be reduced by operating the first brake means 1 in accordance with its operation degree and the setting vehicle speed can be automatically changed to the detected speed of the vehicle when the operation of the first brake means 1 has been completed. This makes it possible to further improve the operability when changing the setting vehicle speed. That is, since speed reduction is usually intended in some cases when braking a front wheel, it is possible to conform to a driver's intention by changing the setting vehicle speed to a vehicle speed at a time of completion of the braking operation. This enables to eliminate an operation of a coast switch (switch for reducing the setting vehicle speed) and thus to improve the operability of a vehicle.

As shown in FIGS. 3 and 4, the cruise control means 5 can be configured to change the setting vehicle speed only after the braking operation of the front wheel by the first brake means 1 or the second brake means 2 (first brake means 1 in this embodiment) has been continuously performed for a predetermined period of time T. This makes it possible to prevent a change of the setting vehicle speed that a driver may not intend, for example, in response to a short operation of the first or second brake means 2 less than the predetermined period of time T.

Although the cruise control means 5 of this embodiment can be configured so that it changes the setting vehicle speed to a vehicle speed when the braking operation has been completed in the case that at least the front wheel was braked by the first brake means 1 or the second brake means 2 (first brake means 1 in this embodiment), the cruise control means 5 can also be configured to perform the change of the setting vehicle speed in response to when deceleration of a vehicle has reached a predetermined value or more. This also makes it possible to suppress a change of the setting vehicle speed to a vehicle speed different from a driver's intended speed.

In addition, as shown in FIGS. 3 and 4, the cruise control means 5 of this embodiment can be configured so that it maintains the setting vehicle speed when only the rear wheel has been braked by the first brake means or the second brake means (second brake means 2 in this embodiment). Thus, it is possible to suppress a change of the setting vehicle speed different from intention of a driver and thus to improve the operability of vehicle. That is, since weak, light, or small speed reductions, fine adjustments or making latitude changes for turning or curving of a vehicle is usually performed in many cases by braking only a rear wheel, it is possible to return to the setting vehicle speed set before braking by maintaining or automatically returning to the setting vehicle speed when the braking operation has been completed. This enables elimination of the need for a driver to operate a resume switch (switch for returning to a setting vehicle speed before braking) and thus to improve the operability of a vehicle.

Furthermore, as shown in FIGS. 3 and 4, the cruise control means 5 can be configured so that it changes the setting vehicle speed to a vehicle speed existing or detected at a time of completion of the braking operation when only the rear wheel has been braked by the first brake means or the second brake means (second brake means 2 in this embodiment) and when the vehicle speed is lower than a predetermined speed. Thus, even if only the rear wheel is braked, it is possible to achieve a low speed travel by changing the setting vehicle speed when the vehicle speed is reduced to a slow speed e.g. at an intersection requiring a slow speed and accordingly possible to prevent unintended acceleration after completion of the braking operation.

In addition, the cruise control means 5 can be configured so that it changes the setting vehicle speed to a vehicle speed existing or detected at a time of completion of the accelerator operation when the accelerator operation is performed by the throttle grip Ga as shown in FIGS. 3 and 4. Thus, it is possible to eliminate an operation of an accelerator switch (switch for increasing the setting vehicle speed) and thus improve the operability of a vehicle as well as to change the setting vehicle speed by operations of the throttle grip Ga in addition to the first and second brake means 1, 2.

In addition, according to the present embodiment, since a travelable creep (imperfect clutching) control can be performed by controlling the clutch K under states of no accelerator operation by the throttle grip Ga and of idling of the driving source E when the vehicle speed is lower than a predetermined value, it is possible for a driver to perform fine adjustment of vehicle speed by the first brake means 1 or the second brake means 2 and thus to achieve smooth travel without accelerator operation in traffic jam etc. during operation of the cruise control means 5.

According to the present embodiment, the saddled vehicle can be configured so that it changes to a neutral state (i.e. the clutch K is switched OFF and any driving power is not transmitted to the driving wheel D) in the creep control when both the first brake means 1 and the second brake means 2 are operated (i.e. both the front wheel brake FB and the rear wheel brake RB are operated). Thus, it is possible to perform a control according to intentions of a driver. That is, since a driver usually intends to stop a vehicle in many cases when both the first and second brake means 1, 2 are operated, it is possible to perform a control matched with requirements of a driver by shifting to the neutral state.

In the present embodiment, the control degree of the vehicle performed by the cruise control means 5 can be the setting vehicle speed (also referred to as "target vehicle speed"). However, in place of or together with this, it may be possible to further provide the saddled vehicle with a driving power limiting means for limiting the driving power of the driving power source E and to make the control degree of the vehicle by the cruise control means 5 a limit degree determined by the driving power limiting means. In this case, the throttle opening can be automatically controlled by throttle control during the operation of the cruise control means 5. However, since the throttle opening is controlled toward a closing side by limiting the driving power with preferentially braking when a driver has operated the first brake means 1 or the second brake means 2, sure braking can be attained. This enables elimination of the braking operation causing release of the cruise control as the prior art. In addition, since the driving power can be limited preferentially to braking when a driver erroneously operated the first brake means 1 or the second brake means 2 simultaneously with the throttle grip Ga during the cruise control, it is possible to prevent an unintentional sudden acceleration.

When the control degree of the vehicle by the cruise control means 5 can be the limit degree determined by the driving power limiting means as described above, it is preferable to set the limit degree of the driving power by the second brake means 2 smaller than that by the first brake means 1. That is, according to the present embodiment, since the first brake means 1 is mounted on the handlebar H at a position near the throttle grip Ga and the second brake means 2 is mounted on the other position (near the grasping grip Gb) and the driving power limit degree of the second brake means 2 is set smaller than that of the first brake means 1, it is possible to prevent reversing of a vehicle on an uphill road during release of operation of the second brake means 2 and thus to achieve smooth start of a vehicle by reducing the driving power limitation to a degree in which a vehicle does not move backward when both the second brake means 2 and the throttle grip Ga are simultaneously operated for performing an uphill road start.

The saddled vehicle comprises detecting sensors (detection means) (Sn9, Sn10) for detecting operated positions of stands (the side stand 12 and the main stand 13) for holding the vehicle in the standing position and a detecting sensor (Sn8) for detecting presence or absence of a driver on a saddle seat. When the detecting sensors Sn9, Sn10 detect that the vehicle is in a standing position and the detecting sensor Sn8 detects that a driver does not seat on the saddle seat 11, the control by the cruise control means 5 is released. This enables elimination of a separate switch for releasing the control by the cruise control means and to more surely release the cruise control.

According to the present embodiment, since the control degree can be changed and the control by the cruise control means 5 can be performed in accordance with the operation conditions of the first and second brake means 1, 2, it is possible to reduce the number of switches necessary for the cruise control and improve the operability relating to the cruise control. More particularly in the present embodiment, driver' demands for the cruise control means 5 can be surely obtained from difference of operations of the first brake means 1 and the second brake means 2 peculiar to the saddled vehicle as compared to a vehicle having a single brake means. In addition, since the degree of control of the vehicle by the cruise control means 5 is the setting vehicle speed, it is possible to further improve the operability relating to cruise control.

Then, the operation and release of the cruise control by the range selection in the saddled vehicle of the present embodiment will be described with reference to a flowchart of FIG. 5.

First of all, it is judged whether the operation means 9 is operated to select D range (drive range) (S1). When judged that the operation means 9 is operated to select D range, it goes to steps S12 and S13 and an indication of D range is indicated in the indication means 10 after the range of the vehicle has been set at D range. When judged it is not operated to select D range at step S1, it goes to step S2 and is judged whether the operation means 9 is operated to select N range (neutral range).

When it is judged that the operation means 9 is operated to select N range, it goes to steps S10 and S11 and an indication of N range is indicated in the indication means 10 after the range of the vehicle has been set at N range. When it is judged that the operation means 9 is not operated to select N range at step S2, it goes to step S3 and is judged whether the vehicle is in N range. When judged the vehicle is in N range, it goes also in this case to steps S10 and S11 and an indication of N range is indicated in the indication means 10 after the range of the vehicle has been set at N range.

In addition, when it is judged that the vehicle is not in N range at S3, it goes to step S4 and is judged whether the vehicle speed is lower than a predetermined value *1 (cruise control upper limit vehicle speed). When judged the vehicle speed is lower than the predetermined value *1, it goes to step S5 and is judged whether the side stand 12 or the main stand 13 is in the operated position or whether a driver does not sit on the saddle seat 11. When not judged the side stand 12 or the main stand 13 is in the operated position or a driver does not sit on the saddle seat 11, it goes to step S6 and is judged whether the range of the vehicle is in C range (cruise control range).

When judged it is not C range at S6, it goes to step S7 and is judged whether it is operated to select C range. When judged it is operated to select C range, it goes to steps S8, S9 and an indication of C range is indicated in the indication means 10 after the range of the vehicle has been set at C range. On the other hand, when judged the vehicle speed is not lower than the predetermined value *1 (cruise control upper limit vehicle speed) (step S4), it is detected by the detecting means (step S5) and it is not operated to select C range (step S7), it goes to steps S12 and S13 and an indication of D range is indicated in the indication means 10 after the range of the vehicle has been set at D range. On the other hand, when judged the vehicle is in C range, it goes to step S8 with skipping step S7.

Then, the control for judging the driver's demand by the driver's demand judgment means 4 of the present embodiment will be described with reference to a flowchart of FIG. 6.

First of all, it is judged whether the vehicle is in C range at step S1. When vehicle is in C range, C range is selected at step S2 and judged whether it is a first time control processing. When judged it is not a first time control processing, it is further judged whether the first brake means 1 has been operated at step S3. When judged the first brake means 1 has been operated at step S3, it is further judged whether a predetermined period of time has elapsed at step S4.

When judged a predetermined period of time has not elapsed yet at step S4, it goes to step S5 and is judged whether the deceleration of the vehicle exceeds a predetermined value. When judged the deceleration does not exceed the predetermined value, it goes to step S6 and is judged whether an accelerator operation by the throttle grip Ga has been performed. When judged the accelerator operation has not been performed at step S6, it goes to step S7 and is judged whether the vehicle speed is lower than a predetermined value (setting vehicle speed change upper limit by the second brake means). When judged the vehicle speed is lower than the predetermined value, it goes to step S8 and is judged whether the second brake means 2 is being operated.

In addition, when judged the second brake means 2 is being operated at step S8, it is judged whether the first brake 1 is being operated at step S10. When judged the first brake means 1 is being operated, the driving power limit is set at 100% e.g. by the driving power limiting means at step S12. As shown in FIG. 7, the driving power limit is an index defined as 100% when the driving power limit is maximum (state of the throttle opening being idle throttle (Idle TH)) and varies in accordance with the vehicle speed.

When judgments in steps S2, S4, S5, S6 and S8 are different from those described above, it goes to step S9 and then step S10 after having set the setting vehicle speed to a present vehicle speed. On the other hand, when judged the vehicle is not in C range at step S1, it goes to step S18 and sets the driving power limit to 0% (no driving power limit) at step S19 after having set the setting vehicle speed to 0 (zero) at step S18 and then judges the clutch control demand is "travel" at step S20. Furthermore, when judged the first brake means 1 is being not operated at step S3, it goes to step S6, skipping steps S4 and S5. In addition, when judged the judgment in step S7 is different from that described above, it goes to step S10, skipping step S8.

On the other hand, when it is judged the first brake means 1 is not being operated at step S10, it goes to step S11 and when the second brake means 2 is being operated at step S11, it goes to step S13 and the driving power limit is set to a predetermined value. When the second brake means 2 is not being operated at step S11, it goes to step S14 and sets the driving power limit to 0% (no driving power limit). It is judged whether the vehicle speed is lower than a predetermined vehicle speed (creep control upper limit vehicle speed) at step S15 after steps S12, S13 and S14. When it is judged the vehicle speed is lower than the predetermined vehicle speed, it is judged at step S16 whether both the first and second brake means 1, 2 are being operated.

When judged both the first and second brake means 1, 2 are not being operated at step S16, it is judged at S17 whether the accelerator is operated. When the accelerator is not being operated, it is judged at step S21 the clutch control demand is "creep". When judged at step S16 both the first and second brake means 1, 2 are operated, it is judged the clutch control demand is "OFF" (i.e. driving power is cut off with the clutch being OFF) at step S22. When judgments in steps S15 and S17 are different from those described above, it goes to step S20 and judges the clutch control demand is "travel".

Then, the cruise control (throttle control) of the engine of the present embodiment will be described with reference to a flowchart of FIG. 8.

First of all, it is judged whether the vehicle is in C range at step S1. When the vehicle is in C range, it is judged whether the accelerator operation is being performed at step S2. When judged the accelerator operation is not been performed, it goes to step S3 and is judged whether the first brake means 1 is being operated. When the first brake means 1 is being operated, it goes to step S4 and is judged whether the vehicle speed is lower than a predetermined vehicle speed (creep control upper limit vehicle speed). When the vehicle speed is not lower than the predetermined vehicle speed, it goes to step S5 and is judged whether a predetermined period of time has elapsed from the cruise throttle (cruise TH) output. When judged at step S5 the predetermined period of time has not lapsed from the cruise throttle output yet, the throttle opening is set to [(cruise TH×(100−driving power limit)/100] at step S10. The cruise TH is set so that it has a relation between the throttle opening and the vehicle speed shown in FIG. 9. On the other hand, when judgments in steps S1~S4 are different from those described above, it goes to step S13 and set the throttle opening to [operation degree of the throttle grip Ga (AP)×{(100−driving power limit)/100}+Idle TH]. The relation between the operation degree of the throttle grip Ga (AP) and the throttle opening (TH) is shown in FIG. 11.

On the contrary, when judged the predetermined period of time has lapsed from the cruise throttle output at step S5, it goes to step S6 and is judged whether the second brake means 2 is being operated. When judged the second brake means 2 is not being operated yet at step S6, it goes to step S7 and is judged whether the vehicle speed is higher than the setting vehicle speed. When judged the vehicle speed is higher than the setting vehicle speed, it goes to step S11 and sets the throttle opening to a value which is obtained by subtracting $\Delta TH$ from a present throttle opening (TH). When judged the second brake means 2 is being operated at step S6, it goes to step S10 and the throttle opening is set to [cruise TH×(100−driving power limit)/100].

When judged the vehicle speed is not higher than the setting vehicle speed at step S7, it goes to step S8 and is judged whether the vehicle speed is lower than a value obtained by subtracting $\Delta$ vehicle speed from the setting vehicle speed. When judged the vehicle speed is higher than the value, it goes to step S10 and the throttle opening is set to {cruise TH×(100−driving power limit)/100}. On the other hand, when judged the vehicle speed is lower than said value, it goes to step S9 and is judged whether the acceleration of the vehicle is smaller than a predetermined value (control acceleration upper limit on cruise control). When the acceleration of the vehicle is smaller than the predetermined value, it goes to step S12 and sets the throttle opening to a value obtained by adding $\Delta TH$ to the present throttle opening (TH).

Then, the gear ratio control of the present embodiment will be described with reference to a flowchart of FIG. 12.

First of all, it is judged whether C range has been selected by the operation means 9 (step S1), whether the accelerator operation has been performed (step S2), whether the first brake means has been operated (step S3), whether the second brake means has been operated (step S4), whether the throttle opening (TH) is smaller than the predetermined throttle opening (ratio control throttle opening upper limit for engine brake) (step S5), and whether the vehicle speed is higher than the setting vehicle speed (step S6). When C range has not been selected, the accelerator operation has been performed, the first or second brake means has been operated, the throttle opening is larger than the predetermined throttle opening, and the vehicle speed is lower than the setting vehicle speed, these all go to step S9 and a Target ratio is set by a gear ratio map shown in FIG. 13.

On the other hand, when C range has been selected, the accelerator has not been operated, both the first and second brake means have not been operated, the throttle opening is smaller than the predetermined throttle opening, and the vehicle speed is higher than the setting vehicle speed, it goes to step S7 and is judged whether the deceleration is larger than 0 (i.e. whether the vehicle is decelerated). When judged the deceleration of the vehicle is smaller than 0 at step S7, it goes to step S8 and sets the Target ratio which is obtained by adding $\Delta$ ratio to a present Target ratio and then goes to step S10 to perform a feedback (FB) control based on the setting Target ratio. When judged the deceleration of the vehicle is larger than 0 at step S7, it goes to step S10 with skipping step S8.

Then, the clutch control of the present embodiment will be described with reference to a flowchart of FIG. 14.

First of all, it is judged at step S1 whether the clutch control demand set at the driver's demand judgment (see FIG. 6) is OFF. When judged it is OFF, it goes to step S3 and turns the clutch K OFF and when judged it is not OFF, it goes to step S2 and it is judged whether the clutch control demand is creep. When it is judged the clutch control demand is creep at step S2, it performs creep control on the clutch K at step S4. When judged the clutch control demand is not creep at step S2, it performs normal travel on the clutch K. The clutch K has the torque capacity (TC) characteristics as shown in FIG. 15.

Then, the clutch control on creep of the present embodiment will be described with reference to a flowchart of FIG. 16.

As described above, the creep control is a control for moving the vehicle under an idling condition of the driving power source E without accelerator operation so as to enable a low speed travel without any accelerator operation. Such creep control is performed by setting the clutch position angle at $\Theta C1$ so that the clutch torque capacity (TC) becomes a predetermined value as shown in FIG. 15. The clutch position angle at $\Theta C1$ can be a clutch position in which the clutch K is partially engaged, less than full engagement of the clutch K.

First of all, it is judged at step S1 whether a predetermined period of time has elapsed from an output to an actuator for setting the clutch at the clutch position angle ($\Theta C1$). When the predetermined period of time has not elapsed yet, it goes to step S9 and an initial clutch position angle in the creep control is set at $\Theta C1$ ($\Theta C=\Theta C1$). When the predetermined period of time has elapsed, it is started a feedback control for the creep control (feedback controls for keeping the idle rotation of the driving power source E and for keeping the clutch torque capacity).

The feedback control for keeping the idle rotation is as follows. That is, it is judged whether the idle rotation of the driving power source E is higher than a predetermined value *1 (step S2) and whether the idle rotation of the driving power source E is lower than a predetermined value *2 (step S3). When the idle rotation of the driving power source E is higher than the predetermined value *1 at step S2, it goes to step S5 and reduces the idle rotation to obtain "Idle TH=Idle TH−$\Delta TH$" and when the idle rotation of the driving power source E is lower than the predetermined value *2 at step S3, it goes to step S6 and increases the idle rotation to obtain "Idle TH=Idle TH+$\Delta TH$".

On the other hand, the feedback control for keeping the clutch torque capacity is as follows. That is, it is judged whether fuel (injected fuel) supplied to the driving power source E is more than a predetermined value at step S4. When the injected fuel is not more than the predetermined value, the clutch position angle is set to a value ($\Theta C-\Delta\Theta C$) which is obtained by subtracting a minute angle ($\Delta\Theta C$) from the clutch position angle ($\Theta C$) at step S8 and increases the clutch torque capacity. When the injected fuel is more than the predetermined value, the clutch position angle is set to a value ($\Theta C+\Delta\Theta C$) which is obtained by adding a minute angle ($\Delta\Theta C$) to the clutch position angle ($\Theta C$) at step S7 and reduces the clutch torque capacity.

Then, the clutch control on travel of the present embodiment will be described with reference to a flowchart of FIG. 17.

As described above, the clutch control on travel is a control for travelling or starting the vehicle based on accelerator operation etc. First of all, it is judged whether the clutch differential rotation (slipping of the clutch K) is within a predetermined value (step S1). When judged the clutch differential rotation is within the predetermined value, it is judged the normal travel will be performed and goes to step S7 to set the clutch position angle ($\Theta C$) to 0 (clutch: ON). When judged the clutch differential rotation is not within the predetermined value, it goes to step S2 and is judged whether a predetermined period of time has elapsed from an output to the actuator for setting the clutch position angle ($\Theta C2$).

When judged the predetermined period of time has not elapsed yet at step S2, it is judged a start control will be performed and then goes to step S4 to set an initial clutch position angle ($\Theta C=\Theta C2$) in the start control. When judged the predetermined period of time has elapsed at step S2, a feedback control for a control on travel. The feedback control on travel is as follows. That is, it is judged whether the engine rotation is higher than a predetermined value (step S3). When it is higher than the predetermined value, the clutch position angle is set at step S5 to a value ($\Theta C-\Delta\Theta C$) obtained by subtracting a minute angle ($\Delta\Theta C$) from the clutch position angle ($\Theta C$) to increase the clutch torque capacity. When judged the engine rotation is not higher than the predetermined value at step S3, the clutch position angle is set at step S6 to a value ($\Theta C+\Delta\Theta C$) obtained by adding a minute angle ($\Delta\Theta C$) to the clutch position angle ($\Theta C$) to reduce the clutch torque capacity.

Then, the second embodiment of the present invention will be described.

Similarly to the first embodiment, a saddled vehicle of this embodiment is a type also driven by a driver sitting on a saddle seat with steering a handlebar as shown FIGS. 18 and 19 and comprises a driving power source (engine) E, a handlebar H, two operation means for performing a braking operation including a first brake means 1 and a second brake means 2', a transmission Z formed of a stepwise transmission, a clutch K, an driving power source ECU 3 as an engine control means, and a transmission ECU 6. Same reference numerals are used also in the second embodiment as those used in the first embodiment and detailed description of them will be omitted.

In the two-wheeled vehicle of the present embodiment, the second brake means 2' operated by a driver's foot is mounted. The second brake means 2' comprises a foot brake operated by a foot of driver sitting on the saddle seat and the two-wheeled vehicle can be braked by a rear wheel brake RB when the foot motion of a driver is detected by a brake operation detection sensor Sn2.

Similarly to the first embodiment, the transmission Z and the clutch K are arranged in the middle of the power transmitting path from the driving power source E to the driving wheel D. The transmission Z is stepwise transmission provided with a dog clutch which can be automatically shifted to a predetermined gear step in accordance with modes set by the operation means 9. The transmission Z can be controlled by the gear ration control mean 7 and adapted to transmit the driving power of the driving power source E to the driving wheel D when it is set to D range ($1^{st}$ gear⇔$2^{nd}$ gear⇔$3^{rd}$ gear⇔$4^{th}$ gear automatic gear shift in this embodiment) and not to transmit the driving power of the driving power source E to the driving wheel D when it is set to N range.

As shown in FIG. 19, the transmission ECU 6 is further electrically connected to the vehicle speed sensor Sn7 and a shift drum angle sensor Sn12 for detecting states of the dog clutch (states of transmission and interruption of power) from the rotation angle of a shift drum Za of the transmission Z to grasp states of the vehicle speed and the dog clutch. A reference numeral Sn4 denotes an engine rotation sensor electrically connected to the driving power source ECU 3.

Similarly to the first embodiment, the transmission ECU 6 of this embodiment comprises the driver's demand judgment means 4 for judging the driver's demand for the cruise control means 5 based on operation conditions of the first brake means 1 and the second brake means 2' and is configured so that it can perform control by the cruise control means 5 based on the driver's demand judged by the driver's demand judgment means 4. This makes it possible to perform controls by the cruise control means 5 by changing the control degree in accordance with operation conditions of the first brake means 1 and second brake means 2', to reduce the numbers of switches and switch operations necessary for the cruise control and thus to improve the operability relating to the cruise control.

Although it is described the saddled vehicle of the present embodiments, the present invention is not limited to the described and illustrated embodiments. For example, it may be possible to use other means different from the operation means 9 as means for starting the cruise control. In addition, the control degree of the vehicle by the cruise control means may be other control degrees used for cruise control such as acceleration, deceleration, vehicle distance, etc. other than setting vehicle speed and limit degree by the driving power limiting means. In addition, other driving power sources such as an electric motor, etc. may be used than an engine (internal combustion engine). Furthermore, the saddled vehicle of the present invention is not limited to the described and illustrated two-wheeled vehicle and thus may be applied to any other types of vehicles such as those driven by a driver sitting on a saddle seat and steered by a handlebar.

The present inventions can be applied to other saddled vehicles although having different appearances and other functions than that described in this application if they are saddled vehicles which can change the control degree in accordance with operation conditions of the first and second brake means and can be controlled by the cruise control means.

What is claimed is:
1. A saddled vehicle configured to be driven by a driver sitting on a saddle seat of the vehicle while steering the vehicle with a handlebar comprising:
 a handlebar comprising first and second ends, a grasping grip provided on the first end and configured to be grasped by a driver, and a throttle grip provided in the second end and configured for an accelerator operation;
 first and second brake operation means for performing braking operations of a front wheel and a rear wheel, each having a different braking operation target;
 a cruise controller configured to perform automatic travel control of the vehicle by controlling the travel of the vehicle to a control degree; and
 a cruise control adjustment means for controlling the control degree wherein the cruise control adjustment means changes the control degree in accordance with operation conditions of the first brake operation means and the second brake operation means.

2. The saddled vehicle of claim 1, further comprising a driver's demand judgment means for judging a driver's demand for the cruise control adjustment means based on the operation conditions of the first brake means and the second brake means and wherein the control by the cruise control adjustment means is performed based on the driver's demand judged by the driver's demand judgment means.

3. The saddled vehicle of claim 1, wherein the control degree of the vehicle controlled by the cruise control adjustment means is a target vehicle speed.

4. The saddled vehicle of claim 3, wherein the cruise control adjustment means changes the target vehicle speed to a speed of the vehicle at a time of completion of a braking operation when at least the front wheel is braked by operation of the first brake operation means or the second brake operation means.

5. The saddled vehicle of claim 4, wherein the cruise control adjustment means performs the change of the target vehicle speed in response to the braking operation of the front wheel by operation of the first brake means or the second brake means, continuously performed for a at least a predetermined period of time.

6. The saddled vehicle of claim 4, wherein the cruise control adjustment means performs the change of the target vehicle speed in response deceleration of the vehicle reaching a predetermined value or more when the braking operation of the front wheel by operation of the first brake means or the second brake means is performed.

7. The saddled vehicle of claim 3, wherein the cruise control adjustment means maintains the target vehicle speed when only the rear wheel has been braked by the first brake means or the second brake means.

8. The saddled vehicle of claim 7, wherein the cruise control adjustment means changes the target vehicle speed to a vehicle speed of the vehicle at a time of completion of a braking operation in which only the rear wheel has been braked by the first brake means or the second brake means when the vehicle is lower than a predetermined speed.

9. The saddled vehicle of claim 8, wherein the cruise control adjustment means changes the target vehicle speed to a vehicle speed of the vehicle at a time of completion of an accelerator operation when the accelerator operation is performed by the throttle grip.

10. The saddled vehicle of claim 1, wherein a creep control for travelling is performed by controlling a clutch under states of no accelerator operation by the throttle grip (Ga) and of idling of a driving source subject to that the vehicle speed is lower than a predetermined value.

11. The saddled vehicle of claim 10, wherein it becomes a neutral state in the creep control when both the first brake means and the second brake means are operated.

12. The saddled vehicle of claim 1 or 2, further comprising a driving power limiting means and wherein the control degree of the vehicle by the cruise control adjustment means is a limit degree determined by the driving power limiting means.

13. The saddled vehicle of claim 12, wherein the first brake means is mounted on the handlebar at a position near the throttle grip and the second brake means is mounted on the handlebar at a position near the grasping grip or a foot brake and wherein the driving power limit degree of the second brake means is set smaller than that of the first brake means.

14. The saddled vehicle of claim 1, wherein a cruise control range and a drive range are selectable and wherein the control by the cruise control adjustment means is performed when the cruise control range is selected and the control by the cruise control adjustment means is released when the drive range is selected.

15. The saddled vehicle of claim 1, wherein further comprising detection means for detecting operated positions of stands for holding the vehicle in the standing position and a detection means for detecting presence or absence of a driver on a saddle seat of the vehicle and wherein the control by the cruise control adjustment means is released when the detection means has detected the operated positions of stands or the detection means has detected absence of a driver on a seat.

16. A saddled vehicle configured to be driven by a driver sitting on a saddle seat of the vehicle while steering the vehicle with a handlebar comprising:
a handlebar comprising first and second ends, a grasping grip provided on the first end and configured to be grasped by a driver, and a throttle grip provided in the second end and configured for an accelerator operation;
first and second brake operation input members, the first brake operation member being operatively connected a front brake configured to brake a front wheel of the vehicle, the second brake operation member being operatively connected to at least a rear brake configured to brake a rear wheel of the vehicle;
a propulsion system configured to drive at least one wheel of the vehicle; and
a cruise controller configured to control the propulsion system so as to cause the vehicle to travel at a target speed, the cruise controller also configured to vary the target speed differently in response to operation of the first and second brake operation input members.

17. The saddled vehicle of claim 16, wherein the cruise controller is configured to detect a speed of travel of the vehicle and to changes the target speed to a detected speed of the vehicle at a time of completion of an operation of at least one of the first and second brake operation input members.

18. The saddled vehicle of claim 17, wherein the cruise controller is configured to change the target speed in response to operation of at least one of the first and second brake operation input members for a predetermined period of time.

19. The saddled vehicle of claim 16, wherein the cruise controller is configured to detect a deceleration of the vehicle and to change the target speed in response the detected deceleration reaching a predetermined value or more.

20. The saddled vehicle of claim 16, wherein the first brake operation input member is mounted on the handlebar at a position near the throttle grip and the second brake operation input member is mounted on the handlebar at a position near the grasping grip or a foot brake.

* * * * *